US012246530B2

(12) United States Patent
Nishihara et al.

(10) Patent No.: US 12,246,530 B2
(45) Date of Patent: Mar. 11, 2025

(54) INKJET RECORDING APPARATUS

(71) Applicant: KYOCERA Document Solutions Inc., Osaka (JP)

(72) Inventors: Masaaki Nishihara, Osaka (JP); Takenori Yamamoto, Osaka (JP); Masayuki Miyake, Osaka (JP); Tatsuya Chuto, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 165 days.

(21) Appl. No.: 18/022,146

(22) PCT Filed: Sep. 28, 2021

(86) PCT No.: PCT/JP2021/035572

§ 371 (c)(1),
(2) Date: Feb. 18, 2023

(87) PCT Pub. No.: WO2022/071292

PCT Pub. Date: Apr. 7, 2022

(65) Prior Publication Data

US 2023/0331004 A1 Oct. 19, 2023

(30) Foreign Application Priority Data

Oct. 2, 2020 (JP) ................................ 2020-167474

(51) Int. Cl.
*B41J 11/00* (2006.01)
*B41J 2/045* (2006.01)
(Continued)

(52) U.S. Cl.
CPC ......... *B41J 11/007* (2013.01); *B41J 2/04561* (2013.01); *B41J 2/145* (2013.01); *B41J 2/1707* (2013.01); *B41J 11/0095* (2013.01)

(58) Field of Classification Search
CPC .................. B41J 2/16526; B41J 11/007; B41J 2002/16573; B41J 2002/16591;
(Continued)

(56) References Cited

U.S. PATENT DOCUMENTS

2011/0227980 A1 9/2011 Saitoh et al.
2012/0194585 A1* 8/2012 Fukuda .................... B41J 29/38 347/9

FOREIGN PATENT DOCUMENTS

JP 2011213095 A 10/2011
JP 2013188927 A 9/2013
JP 2015160425 A 9/2015

* cited by examiner

*Primary Examiner* — Jannelle M Lebron
(74) *Attorney, Agent, or Firm* — IP Business Solutions, LLC.

(57) ABSTRACT

An inkjet recording apparatus includes a conveying belt, a recording head, and a flushing controller. The conveying belt includes the plurality of openings formed as a plurality of rows of openings, each row composed of openings arranged at predetermined intervals in a widthwise direction of the conveying belt. The openings of each of the plurality of rows of openings include overlapped portions at which the openings are over-lapped with the openings of any other of the plurality of rows of openings along a widthwise direction of the conveying belt. The flushing controller allows the recording head to do flushing by allowing each of all the nozzles inclusive of the nozzles facing the overlapped portions to eject ink a predetermined number of times.

12 Claims, 14 Drawing Sheets

(51) Int. Cl.
*B41J 2/145* (2006.01)
*B41J 2/17* (2006.01)

(58) Field of Classification Search
CPC .... B41J 2/1652; B41J 2/1707; B41J 2/04561; B41J 2/145; B41J 11/0095; B41J 2/16508; B41J 13/08; B41J 2/16517; B41J 2/16529; B41J 2/16579; B41J 29/38; B41J 2/2142
See application file for complete search history.

INKJET RECORDING APPARATUS

TECHNICAL FIELD

The present invention relates to inkjet recording apparatuses.

BACKGROUND ART

Conventionally, in an inkjet recording apparatus, such as an inkjet printer, flushing (dry ejection), which is to regularly eject ink through nozzles, is performed in order to reduce or prevent clogging of the nozzles due to drying of the ink. For example, in an inkjet recording apparatus of Patent Literature 1, openings are provided in a conveying belt that conveys recording media, and ink is ejected from each of nozzles of recording heads to allow the ink to pass through the openings in the conveying belt.

CITATION LIST

Patent Literature

Patent Literature 1: JP-A-2011-213095

SUMMARY OF INVENTION

A plurality of rows of openings, each row composed of a plurality of openings arranged at predetermined intervals in a widthwise direction of the conveying belt, may be formed in the conveying belt in a direction of belt travel. In this case, in order to ensure flushing for all the nozzles, the rows of openings are staggered so that adjacent openings of adjacent rows of openings are overlapped at their portions (end portions) along the widthwise direction of the belt. Therefore, there is a problem that when the nozzles located above the overlapped portions of the openings are flushed each time each of the openings passes under the nozzles, this causes excessive flushing and wastes the ink.

The present invention has been made in view of the above problem and therefore has an object of providing an inkjet recording apparatus capable of doing flushing with high accuracy and capable of reducing waste of ink due to unnecessary flushing.

An inkjet recording apparatus according to an aspect of the present invention includes a conveying belt, a recording head, and a flushing controller. The conveying belt includes a plurality of openings and sequentially conveys recording media. The recording head includes a plurality of nozzles that eject ink onto the recording medium being conveyed by the conveying belt to form an image on the recording medium. The flushing controller allows the recording head to do flushing by allowing each of the nozzles of the recording head to eject the ink with a different timing from a timing to form the image and allowing the ink ejected from the nozzle to pass through any one of the plurality of openings. The conveying belt includes the openings formed as a plurality of rows of openings, each row composed of openings arranged at predetermined intervals in a widthwise direction of the conveying belt. The plurality of rows of openings are arranged at predetermined intervals in a direction of conveyance of the conveying belt so that the openings of each of the plurality of rows of openings include overlapped portions at which the openings are overlapped with the openings of any other of the plurality of rows of openings along the widthwise direction of the conveying belt. The flushing controller allows the recording head to do the flushing by allowing each of all the nozzles inclusive of the nozzles facing the overlapped portions to eject the ink a predetermined number of times in an image non-formation period during which travel of the conveying belt causes the openings to pass through a location facing the recording head.

Advantageous Effects of Invention

In the present invention, by bringing the number of flushings for each of all the nozzles inclusive of the nozzles facing the overlapped portions of the openings to a predetermined number, the number of flushings for each nozzle can reach a necessary and sufficient number. As a result, failures in ink ejection can be reduced and waste of ink can be prevented.

DESCRIPTION OF EMBODIMENTS (1. Structure of Inkjet Recording Apparatus)

Figure 1:
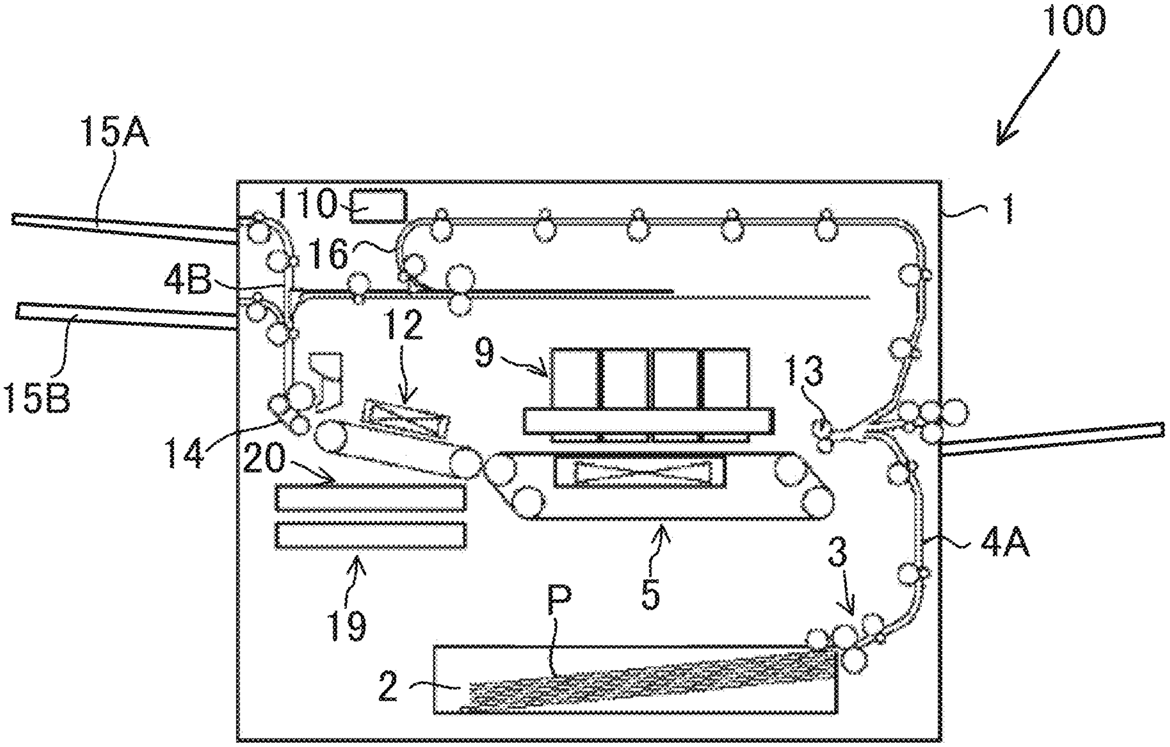
FIG. 1 is an illustration showing a schematic structure of a printer.

Hereinafter, a description will be given of an embodiment of the present invention with reference to the drawings. FIG. 1 is an illustration showing a schematic structure of a printer 100 serving as an inkjet recording apparatus according to one embodiment of the present invention. The printer 100 includes a sheet feed cassette 2 as a sheet container. The sheet feed cassette 2 is disposed at the bottom of the interior of a printer body 1. The interior of the sheet feed cassette 2 contains sheets P as an example of the recording media.

A sheet feeder 3 is disposed downstream of the sheet feed cassette 2 in a direction of sheet conveyance, specifically, upwardly rightward of the sheet feed cassette 2 in FIG. 1. The sheet feeder 3 separates and feeds out the sheets P one by one upwardly rightward of the sheet feed cassette 2 in FIG. 1.

The printer 100 is internally provided with a first sheet conveyance path 4A. The first sheet conveyance path 4A is located toward a direction of sheet feed, that is, upwardly rightward of the sheet feed cassette 2. The first sheet conveyance path 4A conveys the sheet P, which has been fed from the sheet feed cassette 2, vertically upward along a side surface of the printer body 1.

A registration roller pair 13 is provided at a downstream end of the first sheet conveyance path 4A in the direction of sheet conveyance. A first conveyance unit 5 and a recording device 9 are disposed just proximal to a downstream end of the registration roller pair 13 in the direction of sheet conveyance. The sheet P fed from the sheet feed cassette 2 passes through the first sheet conveyance path 4A and reaches the registration roller pair 13. The registration roller pair 13 corrects skew feed of the sheet P and concurrently feeds the sheet P toward a first conveyance unit 5 (particularly, a first conveying belt 8 to be described hereinafter) in time with an ink ejection operation performed by the recording device 9.

The first conveying belt 8 conveys the sheet P, which has been fed to the first conveyance unit 5 by the registration roller pair 13, to a location facing the recording device 9 (particularly, recording heads 17*a* to 17*c* to be described hereinafter). The recording device 9 ejects ink to the sheet P, thus recording an image on the sheet P. During this period, a control device 110 in the interior of the printer 100 controls the ink ejection of the recording device 9.

A second conveyance unit 12 is disposed downstream of the first conveyance unit 5 in the direction of sheet conveyance (to the left of the first conveyance unit 5 in FIG. 1). The sheet P with an image recorded thereon by the recording device 9 is sent to the second conveyance unit 12. During passage of the sheet P through the second conveyance unit 12, the second conveyance unit 12 dries the ink ejected on the surface of the sheet P.

A decurler device 14 is provided downstream of the second conveyance unit 12 in the direction of sheet conveyance and in the vicinity of a left side surface of the printer body 1. The decurler device 14 corrects curl produced in the sheet P the ink on which has been dried by the second conveyance unit 12 and which has been then sent to the decurler device 14.

A second sheet conveyance path 4B is provided downstream of the decurler device 14 in the direction of sheet conveyance (above the decurler device 14 in FIG. 1). In the case where recording on the other side of the sheet P is not executed, the second sheet conveyance path 4B discharges the sheet P, which has passed through the decurler device 14 and passes through the second sheet conveyance path 4B, to a sheet output tray 15A provided externally of the left side surface of the printer 100. A sub sheet output tray 15B for use in discharging unnecessary sheets P (waste sheets) on which a printing failure or the like has occurred is provided below the sheet output tray 15A. The second conveyance unit 12, the decurler device 14, and the second sheet conveyance path 4B are examples of the conveyance mechanism.

A reverse conveyance path 16 for use in recording on both sides of a sheet is provided in an upper portion of the interior of the printer body 1 and above the recording device 9 and the second conveyance unit 12. In the case of recording on both sides of a sheet P, the second sheet conveyance path 4B feeds to the reverse conveyance path 16 the sheet P which has been finished in terms of recording on one side (a first side), then has passed through the second conveyance unit 12 and the decurler device 14, and passes through the second sheet conveyance path 4B.

The reverse conveyance path 16 changes the direction of conveyance of the sheet P, which has been fed to the reverse conveyance path 16, for the purpose of successive recording on the other side (a second side) of the sheet P. The reverse conveyance path 16 allows the sheet P to pass through the upper portion of the printer body 1, feeds the sheet P to the right, and then feeds the sheet P, with the second side thereof upturned, to the first conveyance unit 5 again. The first conveyance unit 5 conveys the sheet P to the location facing the recording device 9. The recording device 9 ejects ink to the second side of the sheet P to record an image on the second side. The sheet P finished in terms of recording on both sides passes through the second conveyance unit 12, the decurler device 14, and the second sheet conveyance path 4B in this order and is then discharged to the sheet output tray 15A A maintenance unit 19 and a capping unit 20 are disposed below the second conveyance unit 12. In performing a purge, the maintenance unit 19 moves horizontally to below the recording device 9, wipes off the ink extruded from the ink ejection ports of the recording heads, and recovers the wiped ink. The term purge means an operation to forcibly extrude ink from the ink ejection ports of recording heads for the purpose of ejecting thickened ink, foreign substances or bubbles remaining in the ink ejection ports. In capping the ink ejection surfaces of the recording heads, the capping unit 20 moves horizontally to below the recording device 9, then moves upward, and is thus placed against the undersides of the recording heads.

Figure 2:
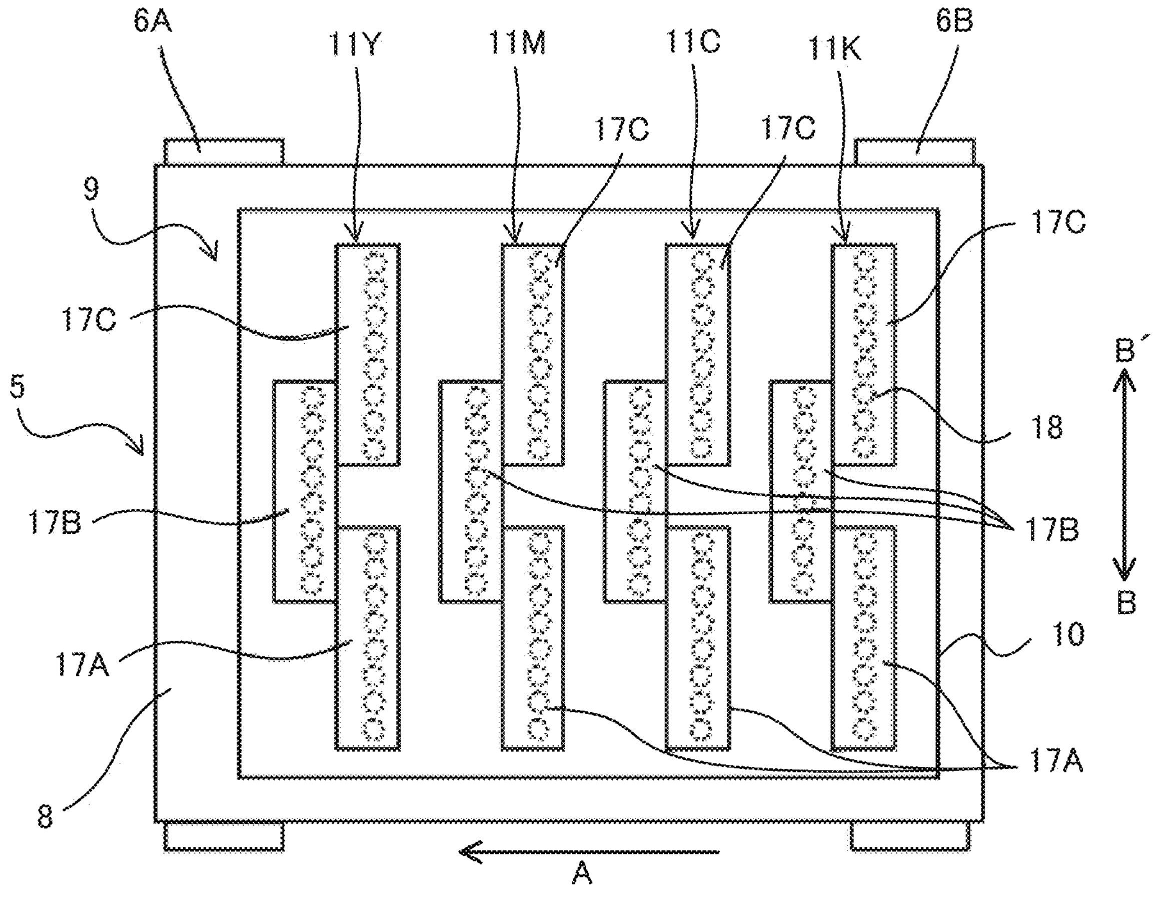
FIG. 2 is a plan view of a recording device provided in the printer.

FIG. 2 is a plan view of the recording device 9. The recording device 9 includes a head housing 10 and line heads 11Y, 11M, 11C, and 11K. The line heads 11Y to 11K are held, in the head housing 10, at a height a predetermined distance (for example, 1 mm) from the conveyance surface of the first conveying belt 8. The first conveying belt 8 is an endless belt mounted around a plurality of rollers including a drive roller 6A, a driven roller 6B, and tension rollers 7A and 7B (see FIG. 3). The drive roller 6A runs the first conveying belt 8 in the direction of conveyance of the sheet P (the direction of the arrow A). A main controller 110D (see FIG. 4) of the control device 110 controls the drive of the drive roller 6A. The plurality of rollers are arranged in order of the tension roller 7A, the tension roller 7B, the driven roller 6B, and the drive roller 6A along the direction of travel of the first conveying belt 8 (see FIG. 3).

Each of the line heads 11Y to 11K includes a plurality of (three in this embodiment) recording heads 17A to 17C. The recording heads 17A to 17C are staggered along a direction of sheet width (a direction of the arrows B and B') perpendicular to the direction of sheet conveyance (the direction of the arrow A). Each of the recording heads 17A to 17C includes a plurality of ink ejection ports 18 (nozzles).

The ink ejection ports 18 are arranged side by side at equal intervals in a widthwise direction of the associated recording head, i.e., in the direction of sheet width (the direction of the arrows B and B'). The line heads 11Y to 11K eject different colored inks of yellow (Y), magenta (M), cyan (C), and black (K) through the ink ejection ports 18 of the recording heads 17A to 17C toward the sheet P being conveyed by the first conveying belt 8.

Figure 3:
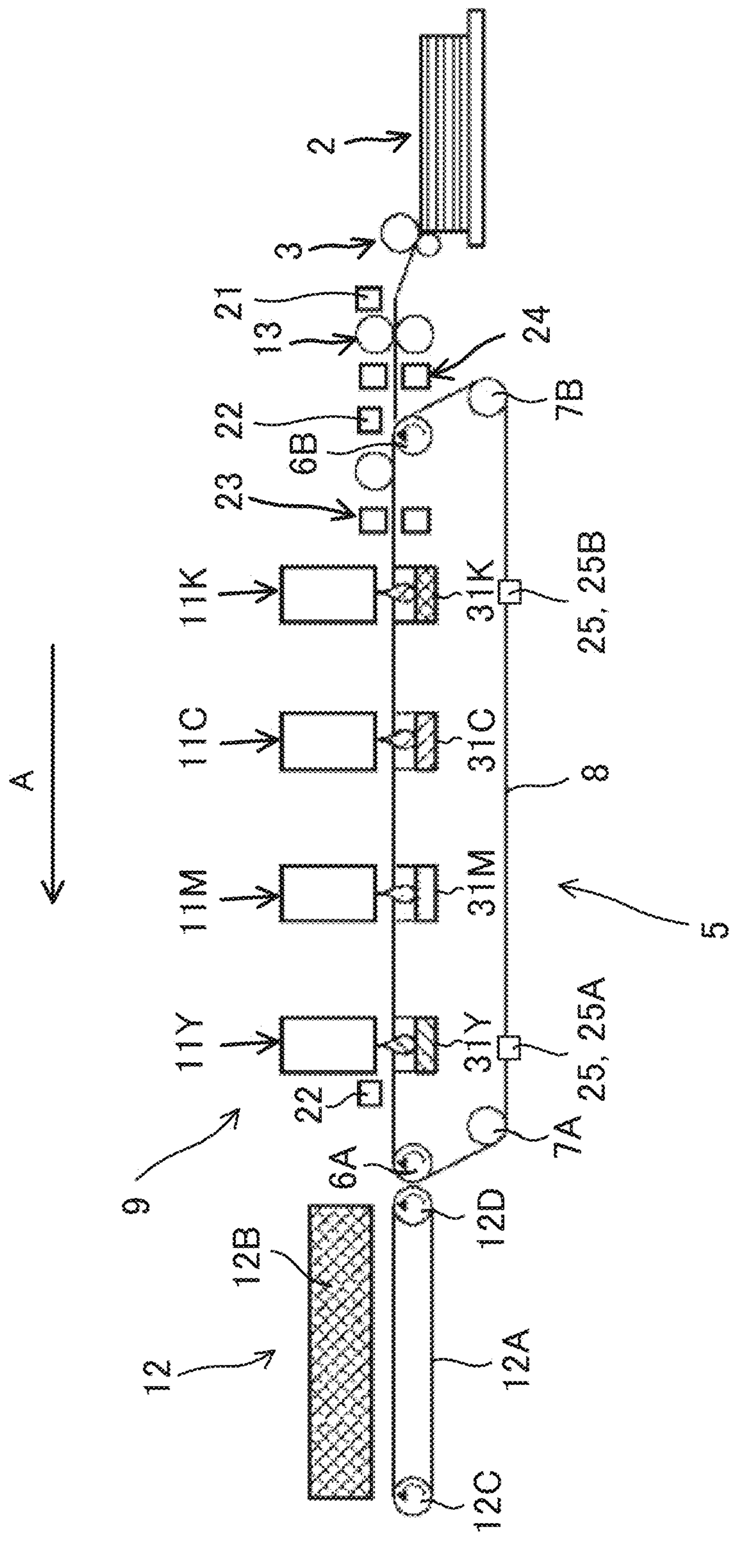
FIG. 3 is an illustration schematically showing the structure of a portion surrounding a sheet conveyance pathway.
Figure 4:
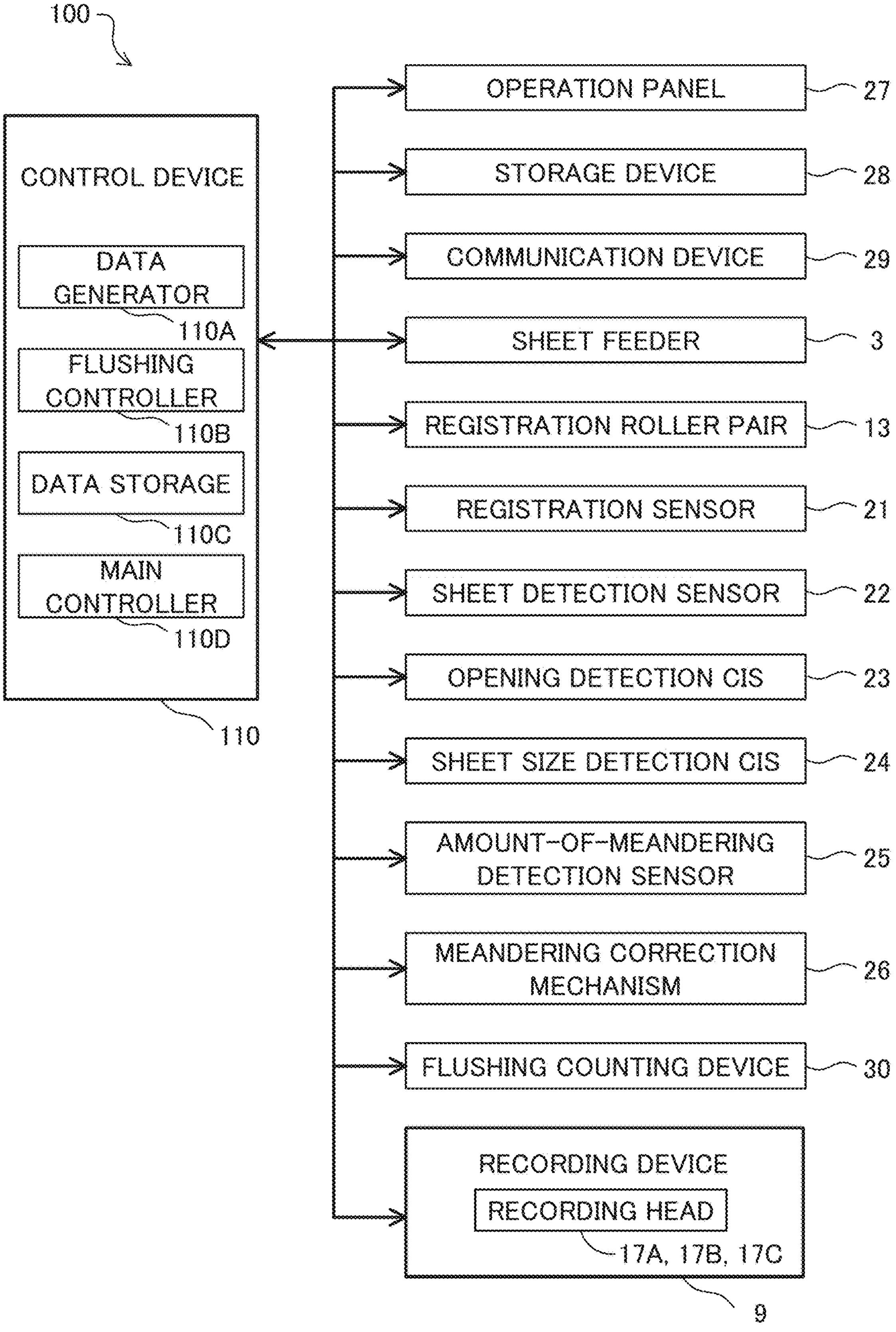
FIG. 4 is a block diagram showing a hardware configuration of an essential portion of the printer.

FIG. 3 schematically shows the structure of a portion surrounding a conveyance pathway for the sheet P from the sheet feed cassette 2 via the first conveyance unit 5 to the second conveyance unit 12. FIG. 4 is a block diagram showing a hardware configuration of an essential portion of the printer 100. The printer 100 further includes, in addition to the previously described structure, a registration sensor 21, a sheet detection sensor 22, an opening detection CIS 23, a sheet size detection CIS 24, amount-of-meandering detection sensors 25, and a meandering correction mechanism 26. The term CIS is an abbreviation of Contact Image Sensor. Although the CISs are transmissive in this embodiment, the CISs may be reflective. The opening detection CIS 23 and the sheet size detection CIS 24 are formed in a long length along the direction of sheet width (see FIG. 6).

The registration sensor 21 detects the sheet P being conveyed from the sheet feed cassette 2 by the sheet feeder 3 and being fed to the registration roller pair 13. The registration sensor 21 is located upstream of the registration roller pair 13 in the direction of conveyance of the sheet P. The main controller 110D of the control device 110 controls, based on the detection result of the registration sensor 21, the timing to start rotating the registration roller pair 13. For example, the main controller 110D controls, based on the detection result of the registration sensor 21, the timing for the registration roller pair 13 to supply a sheet P having been corrected in terms of skew relative to the first conveying belt 8 to the first conveying belt 8.

The sheet detection sensor 22 is a recording medium detection sensor that detects a sheet P and outputs a detection signal. In this embodiment, the sheet detection sensor 22 is disposed between the line head 11K located above the first conveying belt 8 and most upstream in the direction of sheet conveyance and the registration roller pair 13. The sheet detection sensor 22 detects respective passages (timings of passage) of the leading edge and trailing edge of the sheet P being fed from the registration roller pair 13 to the first conveying belt 8.

The sheet detection sensor 22 is located upstream of the opening detection CIS 23 in the direction of sheet conveyance. However, it may be located downstream of the opening detection CIS 23 in the direction of sheet conveyance. The sheet detection sensor 22 is formed of a transmissive or reflective optical sensor. However, it may be formed of a CIS. The control device 110 (for example, the main controller 110D) controls, based on the result of detection of the sheet P from the sheet detection sensor 22, the timing to eject ink to the sheet P conveyed by the first conveying belt 8 and reaching each of respective locations facing the line heads 11Y to 11K (their recording heads 17A to 17C).

Although in this embodiment another sheet detection sensor 22 for detecting the passage of the sheet P is placed downstream of the most downstream line head 11Y in the direction of sheet conveyance, the placement of the other sheet detection sensor 22 may be dispensed with.

The opening detection CIS 23 reads later-described openings 80 (see FIG. 5) in the first conveying belt 8 to acquire opening reading data. The opening detection CIS 23 is located upstream of the recording device 9 and downstream of the sheet detection sensor 22 in the direction of sheet conveyance (the direction of travel of the first conveying belt 8). The opening detection CIS 23 may double as the sheet detection sensor 22.

The sheet size detection CIS 24 detects the size (particularly, the dimension in the direction of sheet width) of the sheet P being fed from the sheet feeder 3 onto the first conveying belt 8 and the location of conveyance in the direction of sheet width. Thus, the control device 110 (for example, the main controller 110D) controls, according to the size of the sheet P for use and the location thereof in the direction of sheet width, the ejection of ink from the ink ejection ports 18 of the recording heads 17A to 17C to form an image on the sheet P.

The amount-of-meandering detection sensor 25 detects the amount of meandering of the first conveying belt 8. The term amount of meandering herein refers to the amount of displacement of the first conveying belt 8 from a reference position in the widthwise direction of the belt. The amount-of-meandering detection sensor 25 is formed of a contact or non-contact displacement sensor that detects the amount of meandering of the first conveying belt 8, for example, based on the detection of displacement of a lateral surface (one lateral side) of the first conveying belt 8. Alternatively, the amount-of-meandering detection sensor 25 may be formed of a CIS long in the widthwise direction of the belt. A plurality of amount-of-meandering detection sensors 25 are located at different locations close to the first conveying belt 8 in the direction of travel. More specifically, the amount-of-meandering detection sensors 25 include: a first amount-of-meandering detection sensor 25A located downstream of the tension roller 7A in the direction of travel of the first conveying belt 8; and a second amount-of-meandering detection sensor 25B located downstream of the first amount-of-meandering detection sensor 25A and upstream of the tension roller 7B in the direction of travel of the first conveying belt 8.

The meandering correction mechanism 26 is a mechanism that corrects meandering of the first conveying belt 8 by inclining the axis of rotation of a roller (for example, the tension roller 7B) around which the first conveying belt 8 is mounted. The main controller 110D controls the meandering correction mechanism 26 based on the amount of meandering of the first conveying belt 8 detected by the amount-of-meandering detection sensors 25. Thus, the meandering of the first conveying belt 8 is corrected.

The printer 100 further includes an operation panel 27, a storage device 28, a communication device 29, and a flushing counting device 30.

The operation panel 27 is an operation device that accepts input of various types of settings. For example, the user can input, through the operation of the operation panel 27, information on the size of sheets P to be loaded into the sheet feed cassette 2, i.e., the size of sheets P to be conveyed by the first conveying belt 8. For another example, through the operation of the operation panel 27, the user can input the number of sheets P to be printed or instruct to start a print job. The operation panel 27 is provided with a display and thus has a function as a notification device that provides a notification about operating conditions (for example, image recording or flushing to be described hereinafter) of the printer 100 by displaying the operating conditions on the display.

The storage device 28 is a memory that stores an operating program for the control device 110 and stores various types of information. The storage device 28 is formed by including a ROM (read only memory), a RAM (random access memory), a non-volatile memory, and so on. Information set through the operation panel 27 is stored in the storage device 28.

The communication device 29 is a communication interface for use in sending and receiving data to and from external devices (for example, a personal computer (PC)). For example, when the user operates a PC to send a print command together with image data to the printer 100, the image data and the print command are input through the communication device 29 to the printer 100. In the printer 100, the main controller 110D controls, based on the image data, the recording heads 17A to 17C to allow the recording heads 17A to 17C to eject ink, resulting in recording of an image on a sheet P.

The flushing counting device 30 counts, during execution of a flushing operation to be described hereinafter, the individual number of flushings (number of ejections of ink) from each of the ink ejection ports 18 of the recording heads 17A to 17C. The flushing counting device 30 sends the counted number of flushings to the main controller 110D.

The printer 100 includes the control device 110. The control device 110 is formed by including a processor, such as a CPU (central processing unit), and a memory. Specifically, when the above-described processor executes a control program, the control device 110 functions as a data generator 110A, a flushing controller 110B, a data storage 110C, and the main controller 110D.

The data generator 110A generates flushing data which is drive data for use in ejecting ink from the recording heads 17A to 17C during execution of flushing. Herein, the term flushing means to eject ink from the ink ejection ports 18 with different timings from timings contributing to image formation (image recording) on the sheet P for the purpose of reducing or preventing clogging of the ink ejection ports 18 due to drying of ink.

The flushing controller 110B drives, based on the flushing data generated by the data generator 110A, the ink ejection ports 18 of the recording heads 17A to 17C to allow the recording heads 17A to 17C to do flushing. The data storage 110C temporarily stores the previously described opening reading data, original data for flushing to be described hereinafter, the flushing data generated by the data generator 110A, and so on. The data storage 110C is formed of, for example, a RAM or a non-volatile memory. The main controller 110D controls the operations of components of the printer 100. The control device 110 may further function as an arithmetic computer capable of doing necessary computing, a timer capable of measuring time or so on. Alternatively, each of the data generator 110A, the flushing controller 110B, and the main controller 110D may double as the above-described arithmetic computer, a timer or so on.

As shown in FIG. 3, the printer 100 includes ink pans 31Y, 31M, 31C, and 31K close to the inner periphery of the first conveying belt 8. When the recording heads 17A to 17C do flushing, the ink pans 31Y to 31K receive and recover ink ejected from the recording heads 17A to 17C and having passed through the openings 80 in the first conveying belt 8. Therefore, the ink pans 31Y to 31K are provided at locations facing the recording heads 17A to 17C of the line heads 11Y to 11K with the first conveying belt 8 in between. The ink recovered by the ink pans 31Y to 31K is drained to, for example, a waste ink tank and disposed of. However, the ink may be reused without being disposed of.

The second conveyance unit 12 includes a second conveying belt 12A and a drier 12B. The second conveying belt 12A is mounted around two rollers: a drive roller 12C and a driven roller 12D. The second conveyance unit 12 conveys the sheet P conveyed by the first conveyance unit 5 and having an image recorded thereon by ink ejection of the recording device 9, dries the sheet P with the drier 12B during conveyance, and delivers the sheet P to the previously described decurler device 14.

(2. Details of First Conveying Belt 8)

Figure 5:
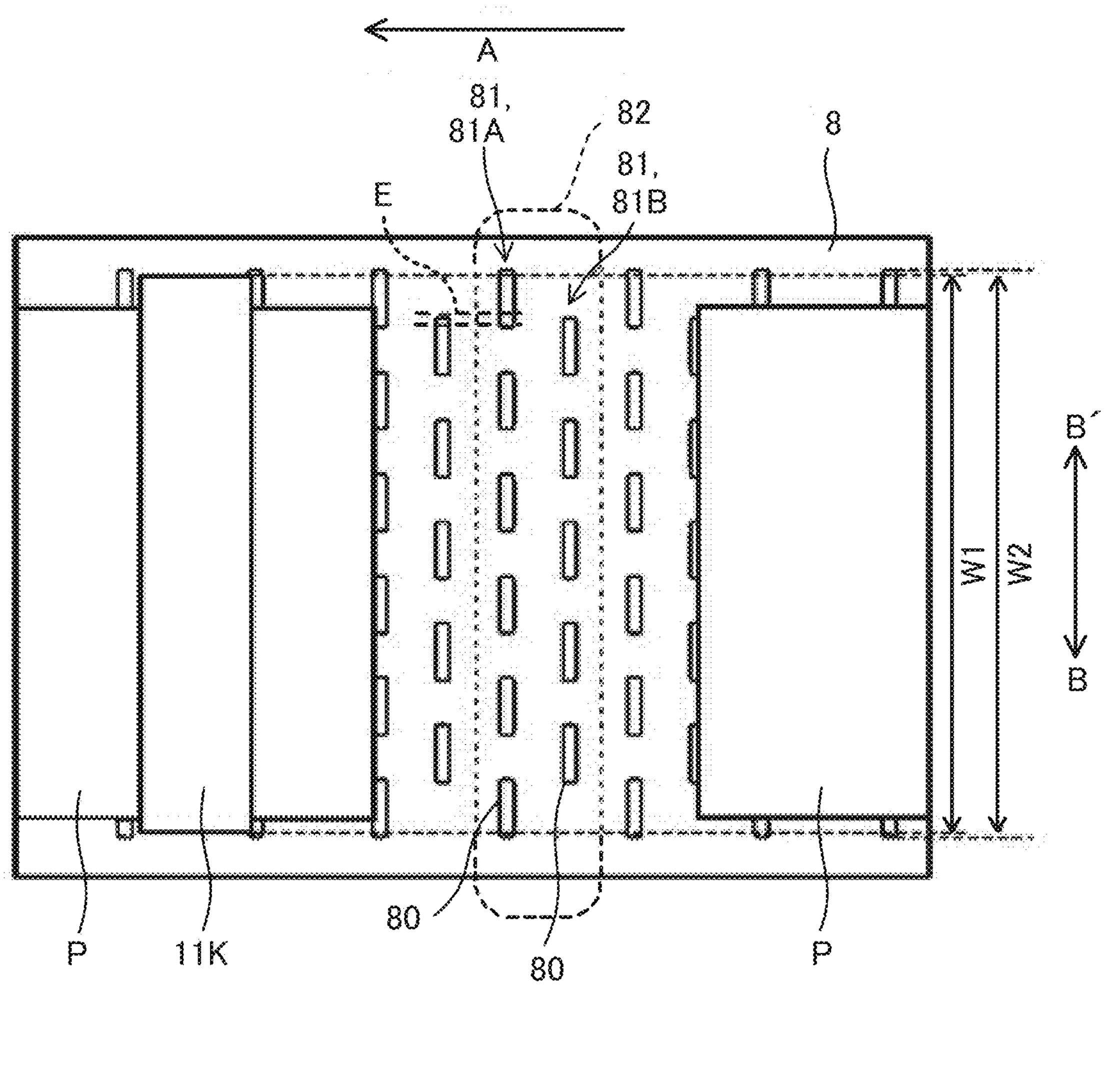
FIG. 5 is a plan view showing a structural example of a first conveying belt.

Next, a detailed description will be given of the first conveying belt 8 of the first conveyance unit 5. FIG. 5 is a plan view showing a structural example of the first conveying belt 8. The first conveying belt 8 for use in conveying sheets P one after another includes a plurality of openings 80. Each opening 80 is formed of an elongated hole extending in the widthwise direction of the belt (the direction of the arrows B and B').

Although in this embodiment the shape of each opening 80 in plan view is rectangular as shown in FIG. 5, the opening 80 may have a shape in which the regions corresponding to the corners of a rectangle are rounded, or other shapes (for example, an elliptical shape).

This embodiment employs a negative-pressure suction system in which the first conveying belt 8 conveys the sheet P with the sheet P sucked against the first conveying belt 8 by negative-pressure suction. The openings 80 double as suction holes allowing suction air produced by negative-pressure suction to pass therethrough.

In the first conveying belt 8 in this embodiment, groups 82 of openings, each group composed of a plurality of openings 80, are arranged at regular intervals in the direction of sheet conveyance (the direction of the arrow A). Each group 82 of openings is composed of a plurality of rows 81 of openings. In this embodiment, each group 82 of openings is composed of two rows 81A, 81B of openings.

Each of the rows 81A, 81B of openings includes a plurality of openings 80 at equal intervals in the widthwise direction of the belt (the direction of the arrows B and B'). The openings 80 of the one row 81A of openings are arranged to be overlapped with the openings 80 of the other row 81B of openings at their portions (their end portions in the longitudinal direction of the openings) along the widthwise direction of the belt (in other words, to have overlapped portions E) when viewed in the direction of conveyance of the sheet P (the direction of the arrow A). That is to say, in the first conveying belt 8, a plurality of openings 80 are arranged in a staggered arrangement. The interval between the groups 82 of openings in the direction of sheet conveyance is equal to the interval between the row 81A of openings and the row 81B of openings in the direction of sheet conveyance.

The openings 80 belonging to the one row 81A of openings and the openings 80 belonging to the other row 81B of openings are formed into axisymmetric shapes and at axisymmetric locations with respect to a center line connecting the centers of the first conveying belt 8 in the widthwise direction of the belt. As a result, the number of openings 80 belonging to the one row 81A of openings is one more than the number of openings 80 belonging to the other row 81B of openings. However, the number of openings 80 in the one row 81A of openings may be equal to the number of openings 80 in the other row 81B of openings.

In this situation, when the head width of each of the line heads 11Y to 11K (the recording heads 17A to 17C) is represented as W1 (mm), the maximum width W2 (mm) of the one row 81A of openings in the first conveying belt 8 is greater than W1. As a result, when the recording heads 17A to 17C do flushing, ink ejected from each of the ink ejection ports 18 of the recording heads 17A to 17C passes through any one of the openings 80 in the row 81A of openings or any one of the openings 80 in the row 81B of openings. Therefore, by allowing the recording heads 17A to 17C to do flushing over the entire head width, clogging due to ink drying can be reduced for all the ink ejection ports 18 of the recording heads 17A to 17C.

Furthermore, when, as shown in FIG. 5, two types of rows 81A, 81B of openings having different patterns of arrangement of openings 80 are alternated in the direction of conveyance of the sheet P, all the ink ejection ports 18 of the recording heads 17A to 17C can be covered using the two types of arrangement patterns. When the openings 80 are arranged so that the two types of arrangement patterns alternately appear with an arbitrary frequency in minimum spacings between sheets, line flushing can be carried out, in intervals between sheets being conveyed, for a span obtained by multiplying the length of the opening 80 in the direction of sheet conveyance by the number of openings 80 in the direction of sheet conveyance.

(3. Flushing Control)

Figure 6:
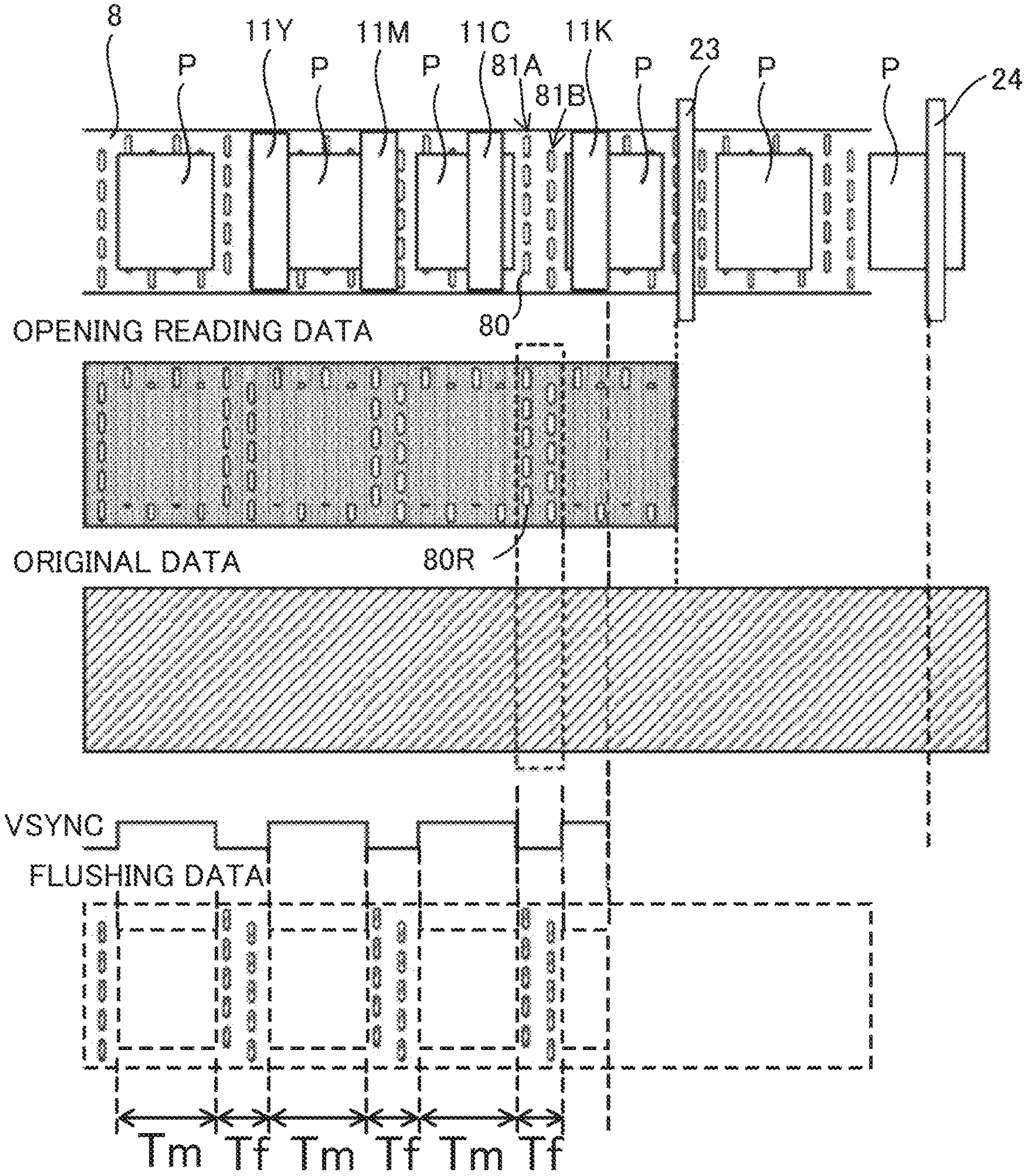
FIG. 6 is an illustration schematically showing a method for generating flushing data.

Next, a description will be given of flushing control over the recording heads 17A to 17C in this embodiment. FIG. 6 is an illustration schematically showing a method for generating flushing data for use in sheet-to-sheet interval flushing. Herein, the term "sheet-to-sheet interval flushing" means a flushing operation to eject ink from the recording heads 17A to 17C into the openings 80 located in each interval between adjacent sheets P being sequentially conveyed on the first conveying belt 8.

The flushing control in this embodiment can be applied to the case where flushing is done toward the openings 80 located off the sheet P in the direction of sheet conveyance, and the timing to do flushing is therefore not limited to a "period between sheets". For example, flushing can be done, under the flushing control in this embodiment, even before an image is formed on a leading sheet P or after an image is formed on a last sheet P (3-1. Detection of Sheet P)

When a sheet P is conveyed from the registration roller pair 13 toward the first conveying belt 8, the sheet size detection CIS 24 detects the width (size) of the sheet P. Thereafter, when the sheet detection sensor 22 detects the passage of the sheet P, it outputs a detection signal (vertical synchronizing signal VSYNC) for the sheet P. The detection signal is a signal that is at a high level during a period when a sheet P is detected and at a low level during a period when no sheet P is detected.

(3-2. Acquisition of Opening Reading Data)

Subsequently, when the sheet P is fed onto the first conveying belt 8, the opening detection CIS 23 reads openings 80 in the first conveying belt 8 to acquire opening reading data.

The opening detection CIS 23 is, for example, transmissive and is formed so that a light-emitting part and a light-receiving part are disposed opposite to each other with the first conveying belt 8 in between. When openings 80 in the first conveying belt 8 are located between the light-emitting part and the light-receiving part, light emitted from the light-emitting part passes through the openings 80 and then reaches the light-receiving part. On the other hand, when something other than the openings 80 in the first conveying belt 8 (for example, a belt portion of the first conveying belt 8 or a sheet P) is located between the light-emitting part and the light-receiving part, light emitted from the light-emitting part is reflected or absorbed by the belt surface or the sheet P and does not reach the light-receiving part. Therefore, as shown in FIG. 6, the opening detection CIS 23 acquires as opening reading data binary data which is white (shown in an unhatched manner) in the regions for the openings 80 in the first conveying belt 8 and is black (shown in a hatched manner) in the region for the rest other than the openings 80. The acquired opening reading data is stored, for example, in the data storage 110C.

(3-3. Generation of Flushing Data)

Next, the data generator 110A generates flushing data for use in ejecting ink from the recording heads 17A to 17C to the openings located in the first conveying belt 8 and off the sheet P on the first conveying belt 8 in the direction of sheet conveyance. The details are as follows.

(Recognition of Openings in Sheet-to-Sheet Interval in Opening Reading Data)

The data generator 110A reads opening reading data from the data storage 110C.

The timing to start reading the opening reading data is a timing delayed a period of time of conveyance of the sheet P over a distance between the sheet detection sensor 22 and the opening detection CIS 23 from a timing to negate a detection signal (VSYNC) of the sheet detection sensor 22. Thus, the data generator 110A can recognize, among the regions for the plurality of openings 80 contained in the opening reading data, regions 80R for the openings 80 located off the sheet P detected by the sheet detection sensor 22 in the direction of sheet conveyance. For example, when the sheet detection sensor 22 sequentially detects the third leading sheet P and the fourth leading sheet P, the data generator 110A reads the opening reading data from the data storage 110C at the above-described timing and thus can recognize the regions 80R of the opening reading data for the openings 80 located between the third sheet P and the fourth sheet P on the first conveying belt 8.

The above-described timing to start reading is a timing in the case where the sheet detection sensor 22 and the opening detection CIS 23 are in a relative position shown in FIG. 3, i.e., in the case where the sheet detection sensor 22 is located upstream of the opening detection CIS 23 in the direction of conveyance of the sheet P If the opening detection CIS 23 is located upstream of the sheet detection sensor 22 in the direction of conveyance of the sheet P, the timing to start reading the opening reading data may be a timing backward for a period of time of conveyance of the sheet P over a distance between the sheet detection sensor 22 and the opening detection CIS 23 from the timing to negate a detection signal (VSYNC) of the sheet detection sensor 22.

(Reading of Original Data)

The data storage 110C of the control device 110 previously stores and keeps original data for flushing. The original data is drive data which is configured to eject ink from all the ink ejection ports 18 of the recording heads 17A to 17C and in which ink ejection is ON. The original data has a data length, for example, corresponding to a lap of the first conveying belt 8. The data generator 110A reads the original data for flushing from the data storage 110C.

(Generation of Flushing Data)

The data generator 110A generates flushing data according to the recognized regions 80R for the openings 80 (flushing data conforming to the locations and shapes of the regions 80R). More specifically, the data generator 110A masks the original data for flushing read from the data storage 110A with the opening reading data likewise read from the data storage 110C. Thus, only portions of the original data overlapped with the regions 80R for openings 80 are left. In other words, only portions of the original data corresponding to the regions 80R for the openings 80 located off the sheets P on the first conveying belt 8 in the direction of sheet conveyance are left. The data generator 110A generates as flushing data the above piece of original data remaining in correspondence with the regions 80R for openings 80. The flushing data generated by the data generator 110A is stored, for example, in the data storage 110C.

(3-4. Execution of Flushing)

The flushing controller 110B recognizes at least one image non-formation period Tf based on a detection signal output from the sheet detection sensor 22. The image non-formation period Tf refers to a period of time while the openings 80 contained in the regions 80R pass through a location facing the recording heads 17A to 17C with the travel of the first conveying belt 8. Because the distance between the sheet detection sensor 22 and the recording heads 17A to 17C and the rate of conveyance of the sheet P are known, the flushing controller 110B can determine the time for conveyance of the sheet P from the sheet detection sensor 22 to the location facing the recording heads 17A to 17C. Therefore, the flushing controller 110B can recognize as the image non-formation period Tf a period of time from a timing (clock time) determined by adding the above time for conveyance to a timing (clock time) at which the detection signal output from the sheet detection sensor 22 switches from a high level to a low level to a timing (clock time) determined by adding the above time for conveyance to a timing (clock time) at which the detection signal switches from a low level to a high level.

The flushing controller 110B allows the recording heads 17A to 17C to do flushing during the above image non-formation period Tf based on the flushing data generated by the data generator 110A. In doing so, because the distance between the opening detection CIS 23 and the recording heads 17A to 17C and the rate of travel of the first conveying belt 8 are known, the flushing controller 110B can determine the time for movement of the openings 80 in the first conveying belt 8 from the opening detection CIS 23 to the location facing the recording heads 17A to 17C. Therefore, the flushing controller 110B allows the recording heads 17A to 17C to do flushing based on the above flushing data after a predetermined time corresponding to the above time for movement passes since the opening detection CIS 23 has detected the openings 80. This flushing allows ink ejected from each of the ink ejection ports 18 of the recording heads 17A to 17C to pass through any one of the openings 80 in the first conveying belt 8 located off the sheet P in the direction of sheet conveyance. The ink having passed through the openings 80 is recovered by the ink pans 31Y to 31K (see FIG. 3) and then sent to the waste ink tank.

The flushing data contains drive data for use in ejecting ink into the openings 80 in the row 81A of openings and drive data for use in ejecting ink into the openings 80 in the row 81B of openings. By which drive data each of the ink ejection ports 18 should be driven may be determined according to the location of the ink ejection port 18 in the widthwise direction of the belt (an opening 80 in which of the rows 81A, 81B of openings faces the ink ejection port 18). The ink ejection ports 18 each capable of facing both an opening 80 in the row 81A of openings and an opening 80 in the row 81B of openings may be driven by any one of the two types of drive data.

A period of time from a timing (clock time) determined by adding the above time for conveyance to the timing (clock time) at which the detection signal output from the sheet detection sensor 22 switches from a low level to a high level to a timing (clock time) determined by adding the above time for conveyance to the timing (clock time) at which the detection signal switches from a high level to a low level can be recognized as an image formation period Tm during which the sheet P detected by the sheet detection sensor 22 passes through the location facing the recording heads 17A to 17C. Therefore, during the image formation period Tm, the main controller 110D can form an image on the sheet P by driving the recording heads 17A to 17C based on the image data.

(3-5. Control of Number of Flushings)

As described previously, the openings 80 in the two types of opening patterns (in the row 81A of openings and the row 81B of openings) are arranged so that the openings 80 in one type of opening pattern are overlapped with those in the other type of opening pattern at their end portions along the longitudinal direction of the openings (the widthwise direction of the belt). Therefore, if the flushing controller 110B executes flushing, routinely based on the flushing data, of the ejection nozzles 18 disposed to face the overlapped portions E (see FIG. 5) of the openings 80, flushing more than necessary will be carried out.

To cope with the above, in this embodiment, the flushing controller 110B executes flushing to allow ink to be ejected a predetermined number of times (an equal number of times) from each of all the ink ejection ports 18 inclusive of the ink ejection ports 18 facing the overlapped portions E. Specifically, when the number of flushings from each of the ink ejection ports 18 counted by the flushing counting device 30 reaches the predetermined number, the flushing controller 110B executes number-of-flushings control for stopping flushing from the ink ejection port 18 having reached the predetermined number of times. A detailed description will be given below of the number-of-flushings control.

Figure 7:
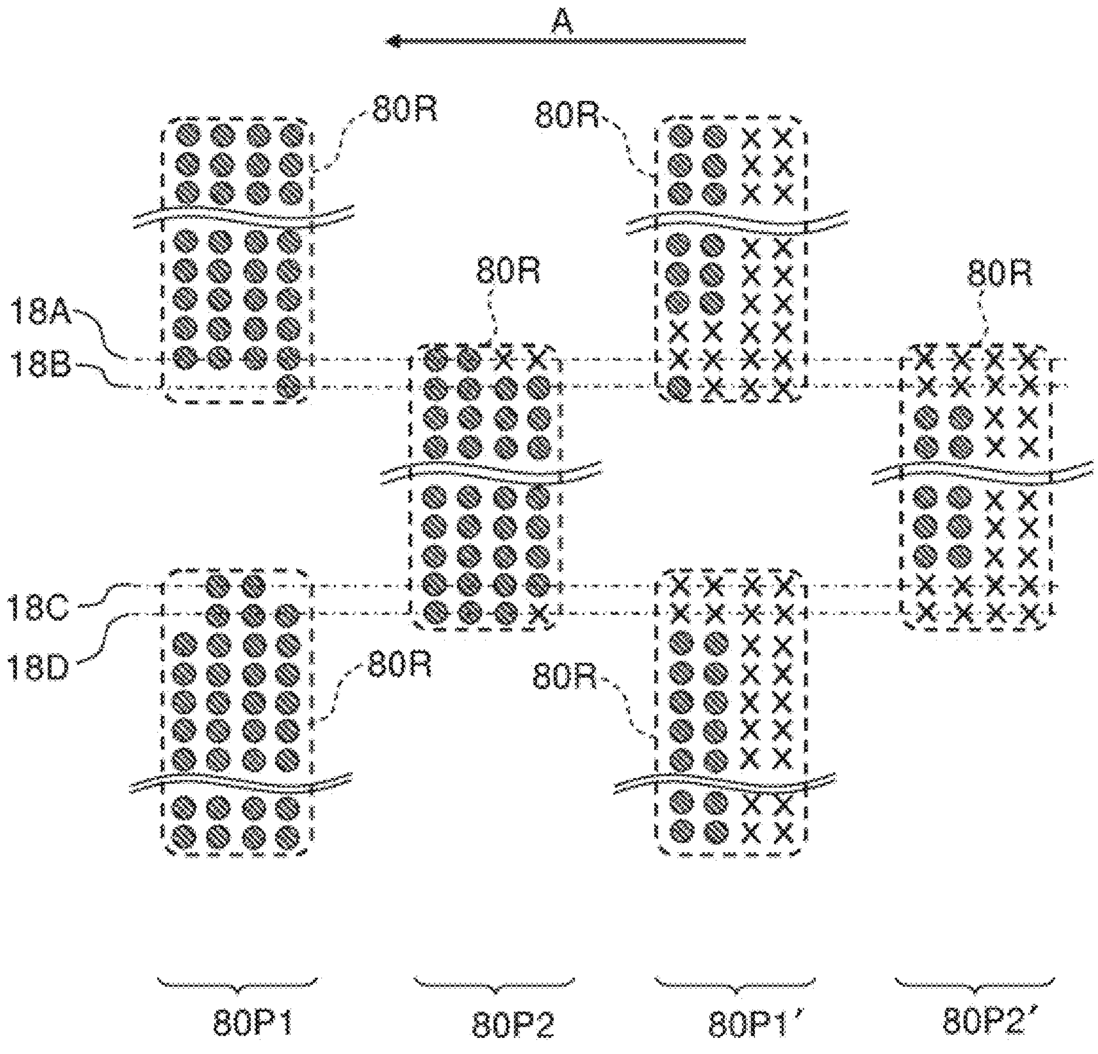
FIG. 7 is an illustration schematically showing a control pattern of the number of flushings.

FIG. 7 is an illustration schematically showing a control pattern of the number of flushings in sheet-to-sheet interval flushing. In the example shown in FIG. 7, flushing data includes, within one sheet-to-sheet interval, first opening patterns 80P1, 80P1' associated with the row 81A of openings (see FIG. 5) and second opening patterns 80P2, 80P2' associated with the row 81B of openings (see FIG. 5). Each of the first opening patterns 80P1, 80P1' and the second opening patterns 80P2, 80P2' includes a plurality of regions 80R, each corresponding to one of the openings 80 in the associated row 81A or 81B of openings. Each region 80R included in each of the first opening patterns 80P1, 80P1' and the second opening patterns 80P2, 80P2' has a size capable of generating ejection data (shown by hatched circles in the figure) for up to four ejections per ink ejection port 18.

Here, assume that the ink ejection ports each meeting with both a region 80R in the first opening pattern 80P1, 80P1' and a region 80R in the second opening pattern 80P2, 80P2' by the movement of the first conveying belt 8 in the direction of sheet conveyance (the direction of the arrow A) are denoted by 18A to 18D. If an ejection-prohibited period is not provided for each of the ink ejection ports 18A to 18D, the flushing controller 110B will execute flushing four times in each of the first opening patterns 80P1 and 80P1' and the second opening patterns 80P2 and 80P2', i.e., 16 times in total. Therefore, for example, if the number of flushings necessary for each ink ejection port 18 in a sheet-to-sheet interval is six, flushing will be carried out more than twice the necessary number of flushings, leading to unnecessary ink consumption.

To cope with the above, for example, as for the ink ejection port 18A, the flushing controller 110B executes flushing four times in the first opening pattern 80P1 and twice in the second opening pattern 80P2, and then sets the rest as an ejection-prohibited period (shown by cross marks in the figure), thus terminating the flushing in the sheet-to-sheet interval.

However, because the flushing data is generated by reading of openings 80 by the opening detection CIS 23, it is not completely uniform to every end portions of the openings 80 due to variations in shape of the openings 80, meandering of the first conveying belt 8, and so on. As a result, as shown in FIG. 7, ejection data on each of the ink ejection ports 18B, 18C, and 18D in the first opening pattern 80P is composed of less than four ejections.

In this relation, as for the ink ejection port 18B, the flushing controller 110B executes flushing once in the first opening pattern 80P1, four times in the second opening pattern 80P2, and once in the first opening pattern 80P', thus completing six flushings in the sheet-to-sheet interval, and then sets the rest as an ejection-prohibited period. Likewise, the flushing controller 110B executes flushing, as for the ink ejection port 18C, twice in the first opening pattern 80P1 and four times in the second opening pattern 80P2, i.e., six times in total, executes flushing, as for the ink ejection port 18D, three times in the first opening pattern 80P1 and three times in the second opening pattern 80P2, i.e., six times in total, and then sets the rest as an ejection-prohibited period.

As for each of the ink ejection ports 18 disposed between the ink ejection port 18B and the ink ejection port 18C, the flushing controller 110B executes flushing four times in the second opening pattern 80P2 and twice in the second opening pattern 80P2', i.e., six times in total, and then sets the rest as an ejection-prohibited period.

Since, in this manner, the number of flushings is counted for each ink ejection port 18 and flushing is completed when the predetermined number of flushings is reached, sheet-to-sheet interval flushing can be performed at a minimal required amount of ink consumption. Furthermore, the counting result can be determined for each ink ejection port 18. Therefore, when, after the completion of a sheet-to-sheet interval flushing, at least one of all the ink ejection ports 18 does not reach a necessary number of flushings, it can be determined that the sheet-to-sheet interval flushing is insufficient.

When the sheet-to-sheet interval flushing is insufficient, an ejection failure may occur during recording on the next sheet P. Therefore, the main controller 110D executes processing such as, for example, stop of printing or handling of the next sheet P as a waste sheet (abnormal product), thus preventing incorporation of print failures. In addition, the main controller 110D provides an error indication on the operation panel 27 to notify the user of the occurrence of an error. Alternatively, the main controller 110D can ensure the necessary number of flushings for the insufficiently flushed ink ejection port 18 by ejecting ink to an unnecessary portion (such as a blank) of the next sheet P.

In the control pattern of the number of flushings shown in FIG. 7, ejection data composed of six flushings for each ink ejection port 18 shows a pattern in which the ink ejection port 18 ejects ink in a successive sequence from a downstream end (a left end in FIG. 7) of each of the first opening pattern 80P1 and the second opening pattern 80P2 constituting the flushing data in the direction of conveyance of the belt (the direction of the arrow A). In other words, the flushing controller 110B allows each ink ejection port 18 to eject ink six times within a predetermined range from a downstream end of the row 81A of openings or the row 81B of openings (see FIG. 5). Therefore, flushing can be completed as early as possible within a single cycle of flushing data and, thus, ink increased in viscosity in the ink ejection ports 18 can be rapidly ejected.

Figure 8:
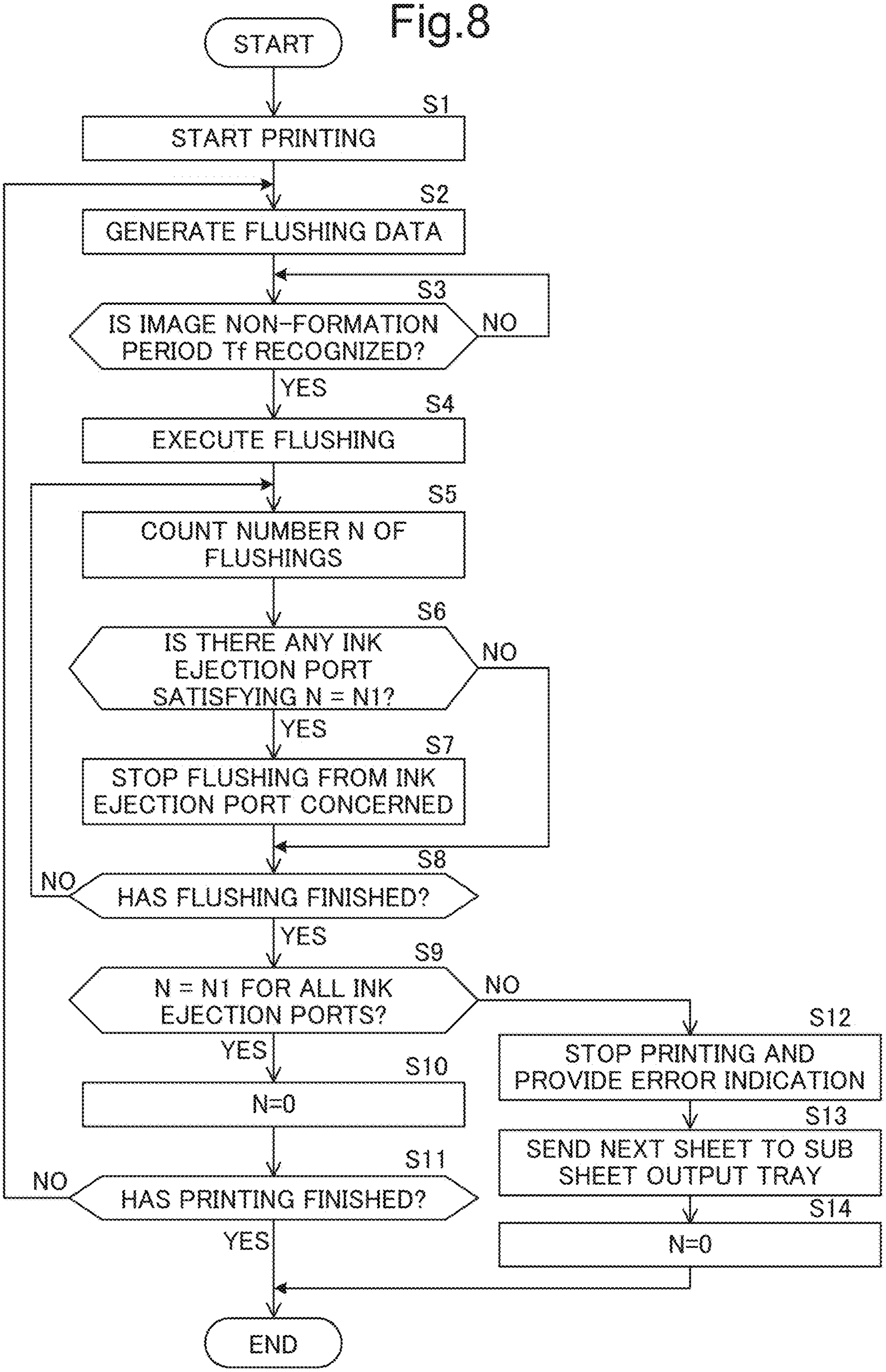
FIG. 8 is a flowchart showing an example of flushing control.

FIG. 8 is a flowchart showing an example of flushing control executed on the printer 100 according to this embodiment. A detailed description will be given below of the procedure of the number-of-flushings control according to the steps in FIG. 8, as necessary, with reference to FIGS. 1 to 7.

When an external device, such as a PC, sends a print command together with image data to the printer 100, the image data and the print command are input through the communication device 29 to the printer 100 and the main controller 110D starts printing (step S1). Next, when a sheet P is fed onto the first conveying belt 8, the opening detection CIS 23 reads the openings 80 in the first conveying belt 8 to acquire opening reading data. The data generator 110A generates, based on the acquired opening reading data, flushing data for use in ejecting ink from the recording heads 17A to 17C toward the openings 80 located off the sheet P on the first conveying belt 8 in the direction of sheet conveyance (step S2).

Next, based on a detection signal output from the sheet detection sensor 22, the flushing controller 110D determines whether or not the image non-formation period Tf is recognized (step S3). When the image non-formation period Tf is not recognized (NO in step S3), this means that the timing to execute sheet-to-sheet interval flushing is not reached. Therefore, the main controller 110D continues printing on the sheet P being conveyed by the first conveying belt 8.

When the image non-formation period Tf is recognized (YES in step S3), the flushing controller 110B allows the recording heads 17A to 17C to do flushing based on the flushing data generated in step S2 (step S4). Concurrently, the flushing controller 110B allows the flushing counting device 30 to count the number N of flushings for each of the ink ejection ports 18 of the recording heads 17A to 17C (step S5).

Next, the flushing controller 110B determines whether or not there is any ink ejection port 18 for which the number N of flushings has reached a predetermined number N1 (for example, six) (step S6). When there is any ink ejection port 18 satisfying N=N1 (YES in step S6), the flushing controller 110B stops flushing from the ink ejection port 18 concerned (step S7). When there is no ink ejection port 18 satisfying N=N1 (NO in step S6), the flushing controller 110B continues the operation of flushing from each ink ejection port 18 based on the flushing data.

Thereafter, the flushing controller 110B determines whether or not the image non-formation period Tf is over, i.e., whether or not flushing has finished (step S8). When flushing is continued (NO in step S6), the flushing controller 110B goes back to the processing in step S5 and continues the execution of flushing, the counting of the number N of flushings, and the determination of whether or not there is any ink ejection port 18 satisfying N=N1 (steps S5 to S7).

When flushing has finished (YES in step S8), the flushing controller 110B determines whether or not the number N of flushings is equal to N1 for all the ink ejection ports 18 (step S9). When N=N1 for all the ink ejection ports 18 (YES in step S9), the flushing controller 110B allows the flushing counting device 30 to reset the number N of flushings for every ink ejection port 18 (set N=0) (step S10). Then, the flushing controller 110B determines whether or not printing has finished (step S11). When printing is continued (NO in step S11), the flushing controller 110B goes back to the processing in step S2 and repeats the same procedure. When printing has finished (YES in step S11), the flushing controller 110B ends the processing for the number-of-flushings control.

When there is any ink ejection port 18 for which N<N1 in step S9 (NO in step S9), the flushing controller 110B sends an error signal to the main controller 110D and the main controller 110D stops printing and provides an error indication on the operation panel 27 (step S12). Then, the main controller 110D discharges the next sheet P as a waste sheet to the sub sheet output tray 15B (step S13), allows the flushing counting device 30 to reset the number N of flushings (set N=0) for every ink ejection port 18 (step S14), and ends the processing for number-of-flushings control.

(3-6. Another Example of Control Pattern of Number of Flushings)

Figure 9:
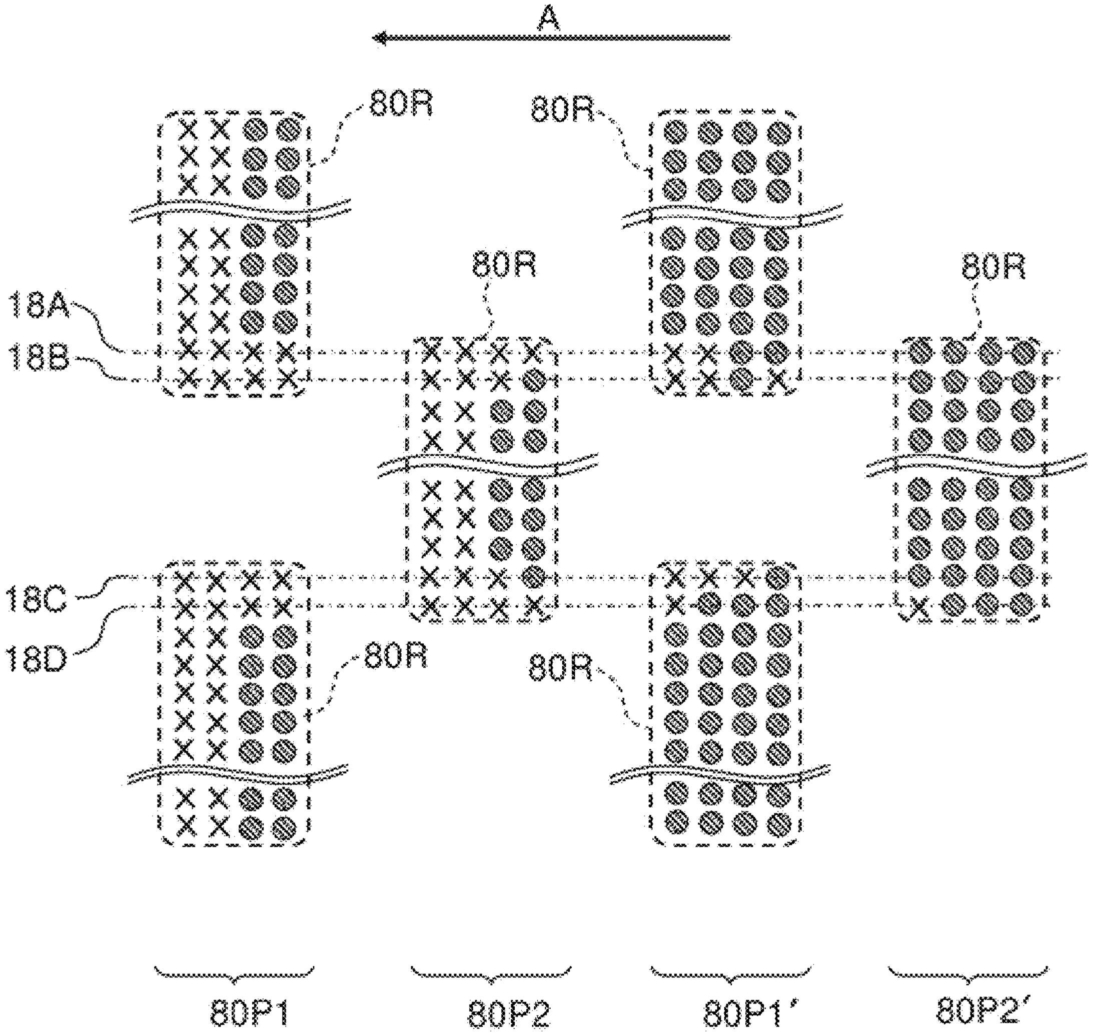
FIG. 9 is an illustration schematically showing another control pattern of the number of flushings.

FIG. 9 is an illustration schematically showing another control pattern of the number of flushings in sheet-to-sheet interval flushing. In the example shown in FIG. 9, ejection data composed of six flushings for each ink ejection port 18 shows a pattern in which the ink ejection port 18 ejects ink in a successive sequence from an upstream end (a right end in FIG. 7) of each of the first opening patterns 80P1, 80P1' and the second opening patterns 80P2, 80P2' constituting the flushing data in the direction of conveyance of the belt (the direction of the arrow A). In other words, the flushing controller 110B allows each ink ejection port 18 to eject ink six times within a predetermined range from an upstream end of the row 81A of openings or the row 81B of openings (see FIG. 5). Therefore, flushing can be completed as late as possible within a cycle of flushing data and, thus, the flushing operation can be completed immediately before ink ejection to the next sheet P. Hence, the effect of flushing on the next printing operation can be further increased.

Figure 10:
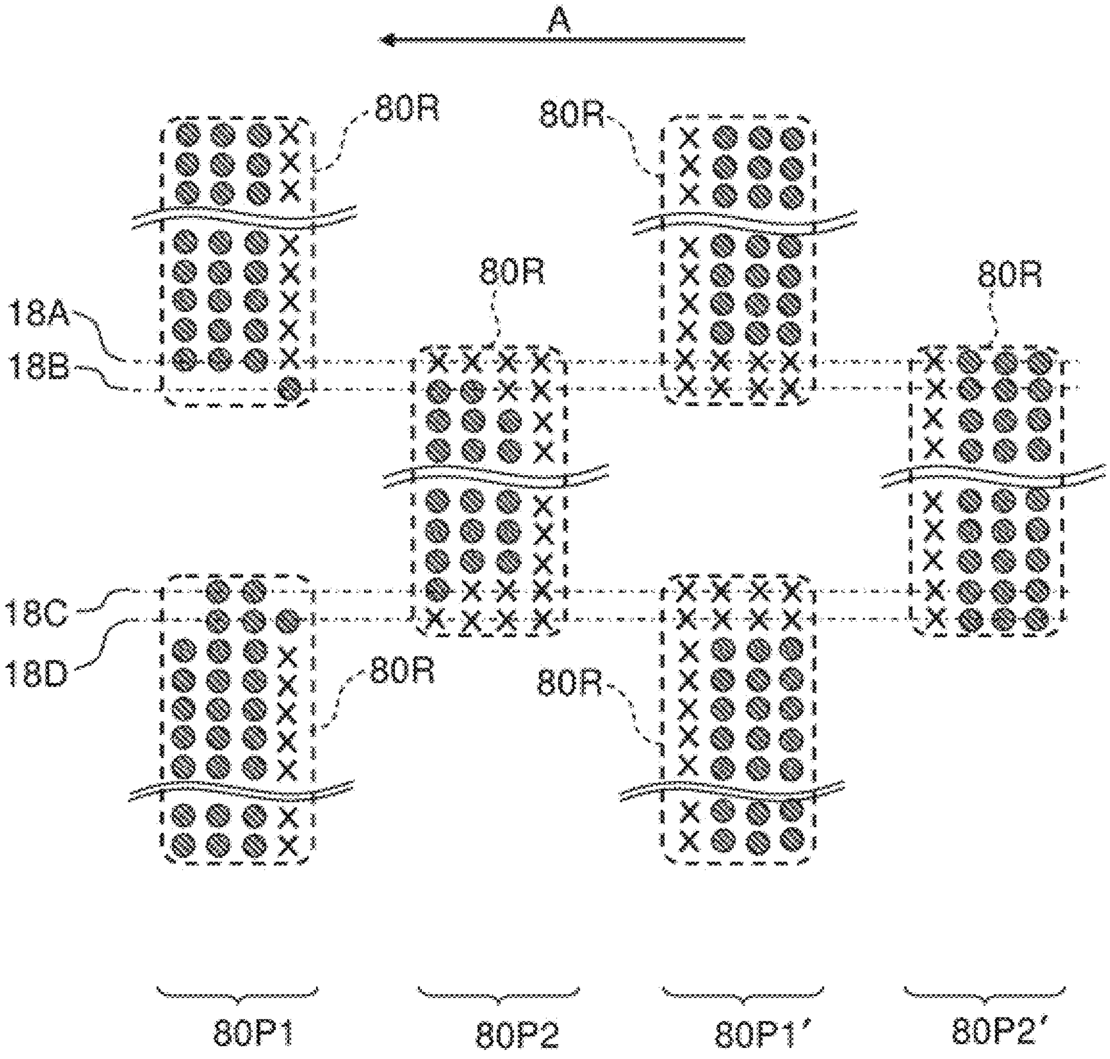
FIG. 10 is an illustration schematically showing still another control pattern of the number of flushings.

FIG. 10 is an illustration schematically showing still another control pattern of the number of flushings in sheet-to-sheet interval flushing. In the example shown in FIG. 10, ejection data composed of six flushings for each ink ejection port 18 shows a pattern in which the ink ejection port 18 ejects ink in a manner separated into a sequence from a downstream end (a left end in FIG. 10) of each of the first opening patterns 80P1, 80P1' and the second opening patterns 80P2, 80P2' constituting the flushing data in the direction of conveyance of the belt (the direction of the arrow A) and a sequence from an upstream end (a right end in FIG. 10) of each of the opening patterns. In other words, the flushing controller 110B allows each ink ejection port 18 to eject ink three times within each of respective predetermined ranges from a downstream end and an upstream end of each of the row 81A of openings and the row 81B of openings (see FIG. 5). Therefore, a period for the predetermined number of flushings includes a portion when flushing is done early (three times on the downstream side) and a portion when flushing is done late (three times on the upstream side). Hence, the ink increased in viscosity in the ink ejection ports 18 can be rapidly ejected and, concurrently, the effect of flushing on the next printing operation can be further increased.

In executing flushing in the control patterns shown in FIGS. 9 and 10, the flushing controller 110B needs to previously set, based on the generated flushing data, with which timing flushing (ejection) should be done from each ink ejection port 18. For example, in the pattern shown in FIG. 9, the flushing controller 110B schedules flushing once in the second opening pattern 80P2, once in the first opening pattern 80P1', and four times in the second opening pattern 80P2', i.e., six times in total. Then, the flushing controller 110B allows the flushing counting device 30 to count the actual number N of flushings and terminates the flushing at the time of N=N1 (six).

[4. Effects]

As thus far described, in this embodiment, the opening detection CIS 23 directly reads the openings 80 in the first conveying belt 8 to acquire opening reading data and, using the acquired opening reading data, flushing data is generated instantly (immediately before flushing) according to regions 80R of the opening reading data for openings 80 located off the sheet P in the direction of sheet conveyance (i.e., according to the locations, sizes, and shapes of the regions R). Thus, even when the first conveying belt 8 meanders or when the locations, sizes or shapes of the openings 80 differ between first conveying belts 8 used, the flushing controller 110B drives the recording heads 17A to 17C based on the above flushing data within each image non-formation period Tf, which enables ink ejected from the ink ejection ports 18 of the recording heads 17A to 17C to pass through every opening 80 in the first conveying belt 8 (for example, every opening 80 located between sheets) with high accuracy. In other words, flushing can be performed with high accuracy without being influenced by the running condition of the first conveying belt 8 during flushing, the locations of the openings 80 in the first conveying belt 8 during flushing, or other conditions.

Furthermore, the data generator 110A masks the original data for flushing with the opening reading data and generates as flushing data a piece of the original data left in correspondence with (in overlaps with) the regions 80R of the opening reading data for openings 80 by the masking. Thus, flushing data for use in ejecting ink to the openings 80 concerned can be surely acquired.

The original data for flushing has a data length corresponding to a lap of the first conveying belt 8. In this case, the data generator 110A can generate, based on the opening reading data and the original data, flushing data which enables the recording heads 17A to 17C to do flushing in all of image non-formation periods Tf existing within the lap of the first conveying belt 8.

By counting the number of flushings for each ink ejection port 18 and doing flushing only a necessary number of times, waste of ink can be prevented as well as failures in ink ejection can be reduced. In addition, whether or not the necessary number of flushings has been executed can be checked for each ink ejection port 18, which enables an error detection in the event of insufficient flushing.

[5. Another Method for Generating Flushing Data]

Figure 11:
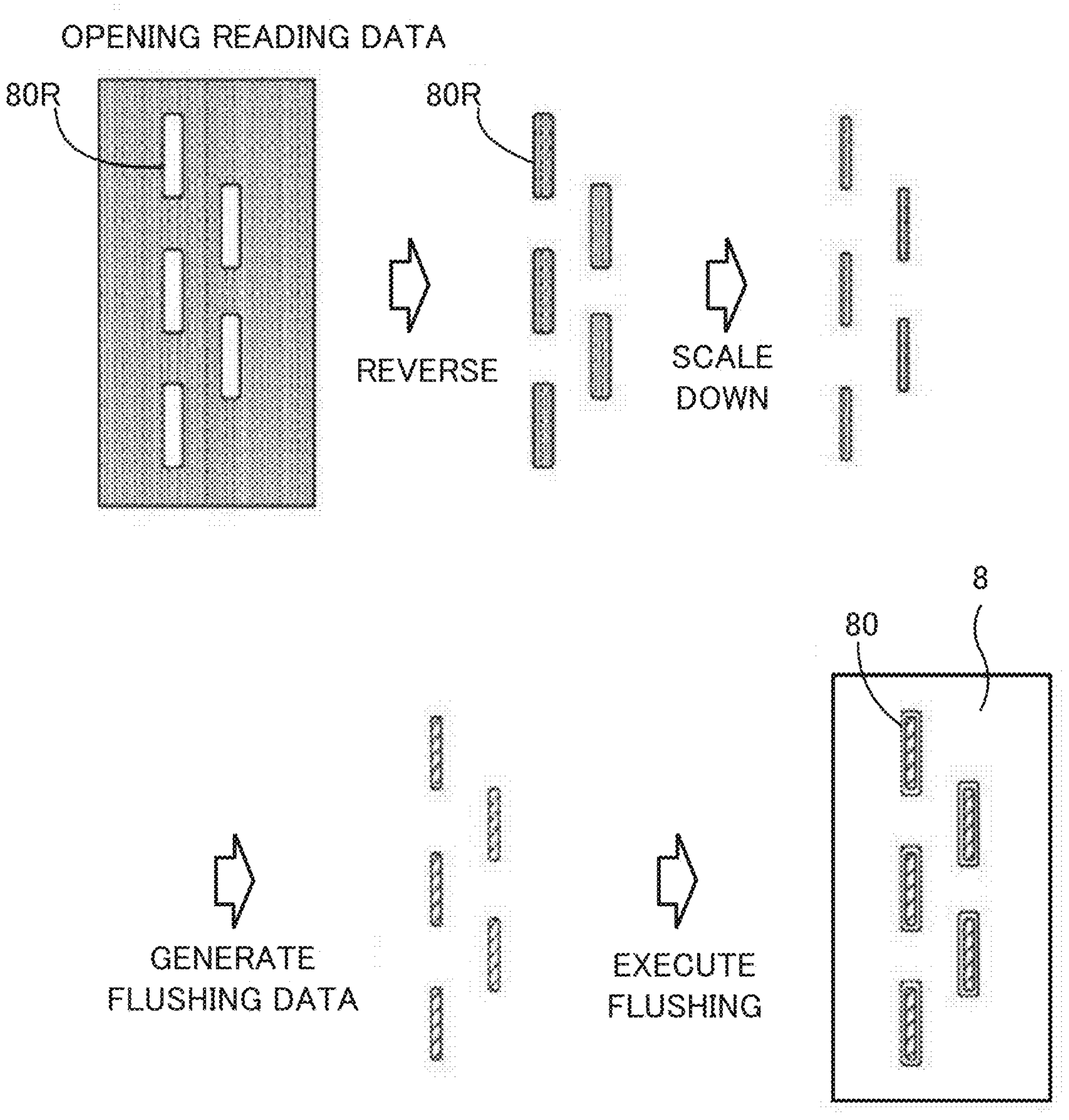
FIG. 11 is an illustration schematically showing another method for generating flushing data.

FIG. 11 is an illustration schematically showing another method for generating flushing data. The data generator 110A may scale down the regions 80R of the opening reading data for the openings 80 and generate flushing data based on data on the scale-down regions 80R and the above-described original data. For example, the data generator 110A may reverse the opening reading data to extract only the regions 80R from the opening reading data, scale down the extracted regions 80R, and cross the scale-down data with the original data, thus generating flushing data.

When the flushing controller 110B drives the recording heads 17A to 17C based on the flushing data generated in the above manner, ink ejected from the recording heads 17A to 17C passes through narrower regions of the openings 80 in the first conveying belt 8. Thus, even if, during flushing, the timing to eject ink is slightly off a predetermined timing or the rate of conveyance of the first conveying belt 8 slightly deviates from a predetermined rate, the ejected ink is highly likely to pass through the openings 80 without hitting the portions of the belt surface surrounding the openings 80. Therefore, the occurrence of contamination of the first conveying belt 8 due to adhesion of ejected ink to the portions of the first conveying belt 8 surrounding the openings 80 can be reduced.

In this case, it is preferred that the plurality of openings 80 in the first conveying belt 8 are arranged in a pattern in which when the flushing controller 110B drives the recording heads 17A to 17C based on the flushing data generated by the data generator 110A, ink ejected from every ink ejection port 18 of the recording heads 17A to 17C passes through any one of the openings 80. This arrangement of the plurality of openings 80 can be applied to the case of generating flushing data by scaling down the regions 80R for the openings 80 as described previously, but, needless to say, can also be applied to the case of generating flushing data, as shown in FIG. 6, without scaling down the regions 80R.

The arrangement of the plurality of openings 80 in the first conveying belt 8 in the above pattern enables ink ejected from every ink ejection port 18 of the recording heads 17A to 17C during execution of flushing to definitely pass through any one of the plurality of openings 80, more specifically, any one of the openings 80 in one of the row 81A of openings and the row 81B of openings, when the data generator 110A generates flushing data by scaling down the regions 80R of the opening reading data for the openings 80 and also when it generates flushing data without scaling down the regions 80R. Thus, all the ink ejection ports 18 of the recording heads 17A to 17C can be flushed and the occurrence of clogging can be reduced for all the ink ejection ports 18.

Particularly, when flushing data is generated by scaling down the regions 80R for the openings 80, the regions scaled down for the openings 80 in the row 81A of openings are likely not to be overlapped with the regions scaled down for the openings 80 in the row 81B of openings as viewed in the direction of conveyance. When the recording heads 17A to 17C are driven based on the generated flushing data with the scale-down regions not overlapped with each other as viewed in the direction of conveyance, some ink ejection ports 18 cannot allow ejected ink to pass through the openings 80 and, thus, all the ink ejection ports 18 cannot be flushed. Therefore, the arrangement of the plurality of openings 80 in the above pattern is very effective particularly when flushing data is generated by scaling down the regions 80R for the openings 80.

[6. Still Another Method for Generating Flushing Data]

Figure 12:
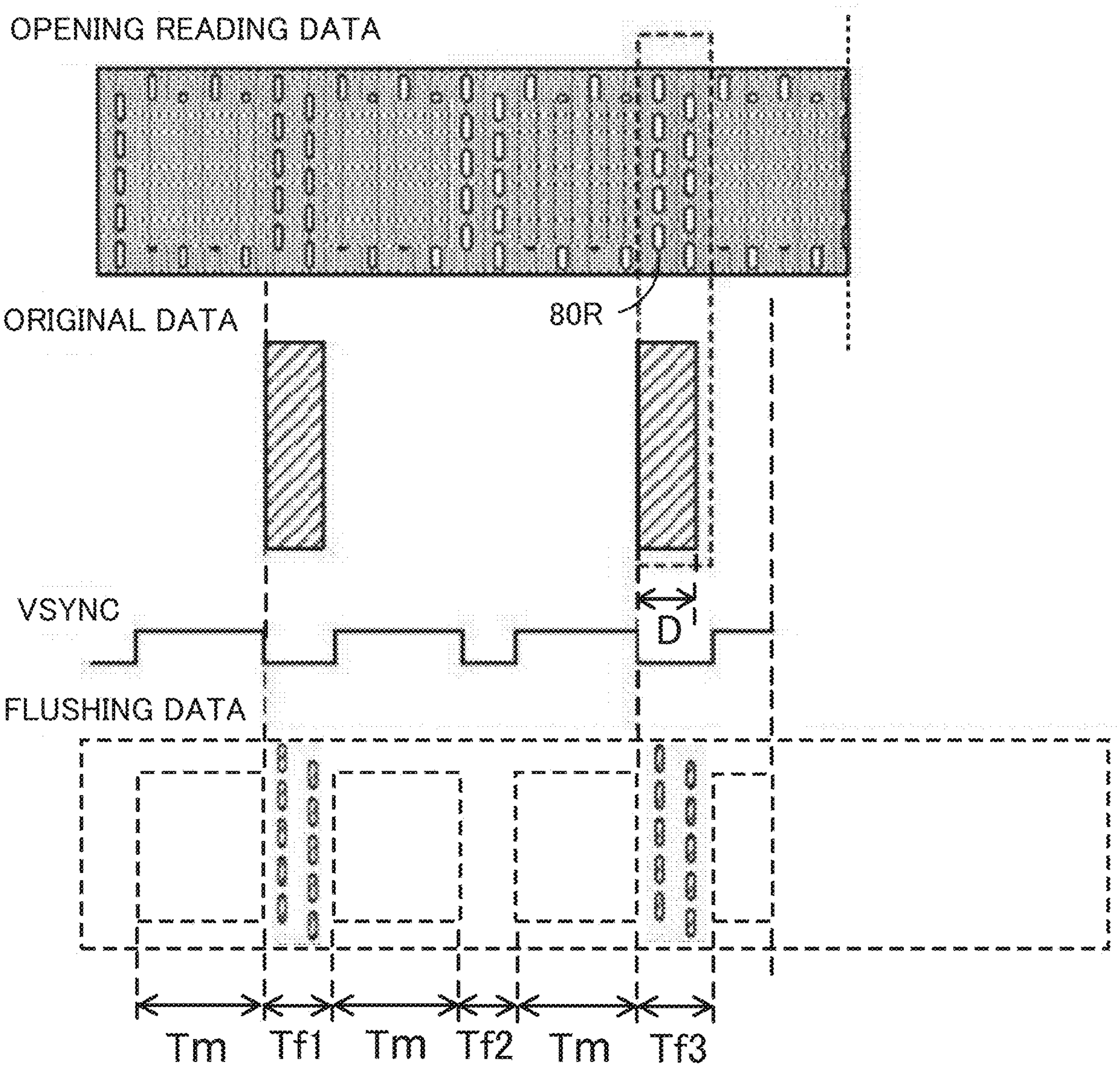
FIG. 12 is an illustration schematically showing still another method for generating flushing data.

FIG. 12 is an illustration schematically showing still another method for generating flushing data. The data generator 110A may generate flushing data for allowing the recording heads 17A to 17C to do intermittent flushing in a plurality of image non-formation periods Tf according to the frequency of ink ejection in an image formation period Tm during which a sheet P detected by the sheet detection sensor 22 passes through the location facing the recording heads 17A to 17C.

FIG. 12 shows as an example the case where when Tf1 represents an image non-formation period between a first leading sheet P and a second sheet P. Tf2 represents an image non-formation period between the second sheet P and a third sheet P, and Tf3 represents an image non-formation period between the third sheet P and a fourth sheet P, the data generator 110A generates flushing data for executing flushing in the image non-formation periods Tf1 and Tf3 only. No flushing data for the image non-formation period Tf2 is generated, that is, flushing is not executed in the image non-formation period Tf2. Execution of flushing in the image non-formation periods Tf1 and Tf3 between which the image non-formation period Tf2 without execution of flushing intervenes is herein referred to as "intermittent" flushing. In other words, intermittent flushing refers to a manner of flushing in two image non-formation periods Tf between which at least one image non-formation period Tf without execution of flushing intervenes. Herein, every operation performed in a plurality of chronologically arranged periods while skipping at least one period is referred to as an "intermittent" operation.

The data generator 110A can generate the above-described flushing data by intermittently assigning the original data to the image non-formation periods Tf1 and Tf3 and masking the original data with the opening reading data.

The frequency of ink ejection in the image formation period Tm can be recognized, for example, by the main controller 110D that controls the ejection of ink from each of the ink ejection ports 18 of the recording heads 17A to 17C according image data in the image formation period Tm. Specifically, the main controller 110D can determine the frequency of ink ejected from each ink ejection port 18 (whether or not the number of ejections is more than a predetermined number), for example, by obtaining the number of ejections of ink from a specified ink ejection port 18 in a predetermined period of time based on image data.

For example, when the frequency of ink ejection in each image formation period Tm is high (the number of ejections is more than the predetermined number), clogging of the ink ejection ports 18 due to drying of ink may be able to be reduced without having to do flushing in all the image non-formation periods Tf1 to Tf3. When, as described above, the data generator 110A generates flushing data for doing, according to the frequency of ink ejection, intermittent flushing in the plurality of image non-formation periods Tf1 to Tf3, i.e., flushing in the image non-formation periods Tf1 and Tf3, the recording heads 17A to 17C, when doing flushing based on the flushing data, can do flushing in the image non-formation periods Tf1 and Tf3, i.e., intermittent flushing, and, thus, excessive flushing thereof can be reduced. As a result, the increase in the amount of waste ink consumed due to excessive flushing can be reduced.

Furthermore, the data generator 110A generates flushing data based on the opening reading data and the original data and generates flushing data by assigning the original data intermittently in the plurality of image non-formation periods Tf1 to Tf3, i.e., assigning it to the image non-formation periods Tf1 and Tf3. Thus, flushing data for doing flushing in the image non-formation periods Tf1 and Tf3, i.e., intermittent flushing, can be easily generated.

Figure 13:
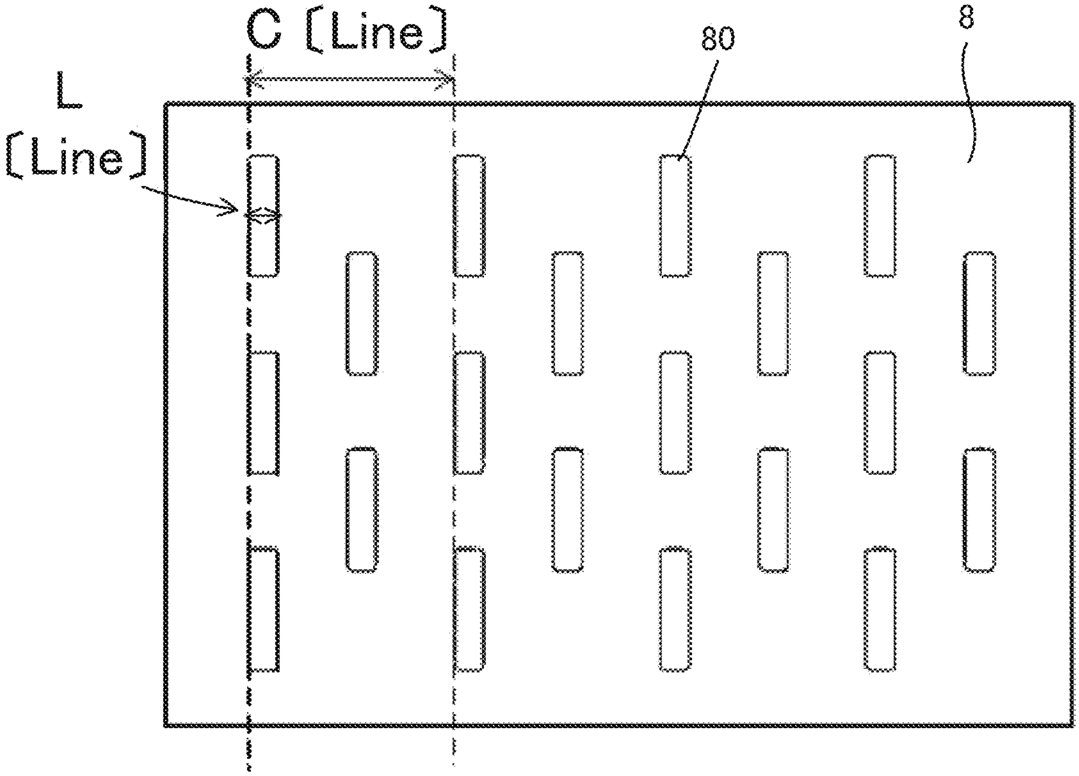
FIG. 13 is an illustration schematically showing an arrangement pattern of openings in the first conveying belt.

FIG. 13 schematically shows an arrangement pattern of openings 80 in the first conveying belt 8. The data generator 110A may set the length D of the above-described flushing data in the direction of conveyance of the sheet P based on the length L of the opening 80 in the first conveying belt 8 in the direction of sheet conveyance, the arrangement cycle C of the openings 80 in the direction of sheet conveyance, and the number F of lines for ink ejection ports 18 necessary for flushing in the image non-formation period Tf. The length L, the length D, and the arrangement cycle C are each converted to the number of lines for ink ejection ports 18 (i.e., the number of ejections in the direction of sheet conveyance).

When $D \geq (F/L) \times C$ (where F/L is a value obtained by rounding up the value after the decimal point) is satisfied where L, C, D, and F are defined as described above, flushing over a necessary number of lines or more can be done for all the ink ejection ports 18 of the recording heads 17A to 17C. Therefore, for example, when the length D of the flushing data in the direction of conveyance of the sheet P is set to satisfy $D=(F/L) \times C$, necessary flushing for all the ink ejection ports 19 can be done at a minimum amount of ink ejection within a single image non-formation period Tf. In this case, the increase in amount of waste ink consumed due to excessive flushing can be surely reduced. In addition, even when the sheet-to-sheet interval is longer than necessary, it is not necessary to do flushing in all of sheet-to-sheet intervals. Like the above, the increase in amount of waste ink consumed due to excessive flushing can be surely reduced. The length D of the flushing data can be realized by setting the length of the original data in the direction of conveyance at D.

[7. Yet Still Another Method for Generating Flushing Data]

Figure 14:
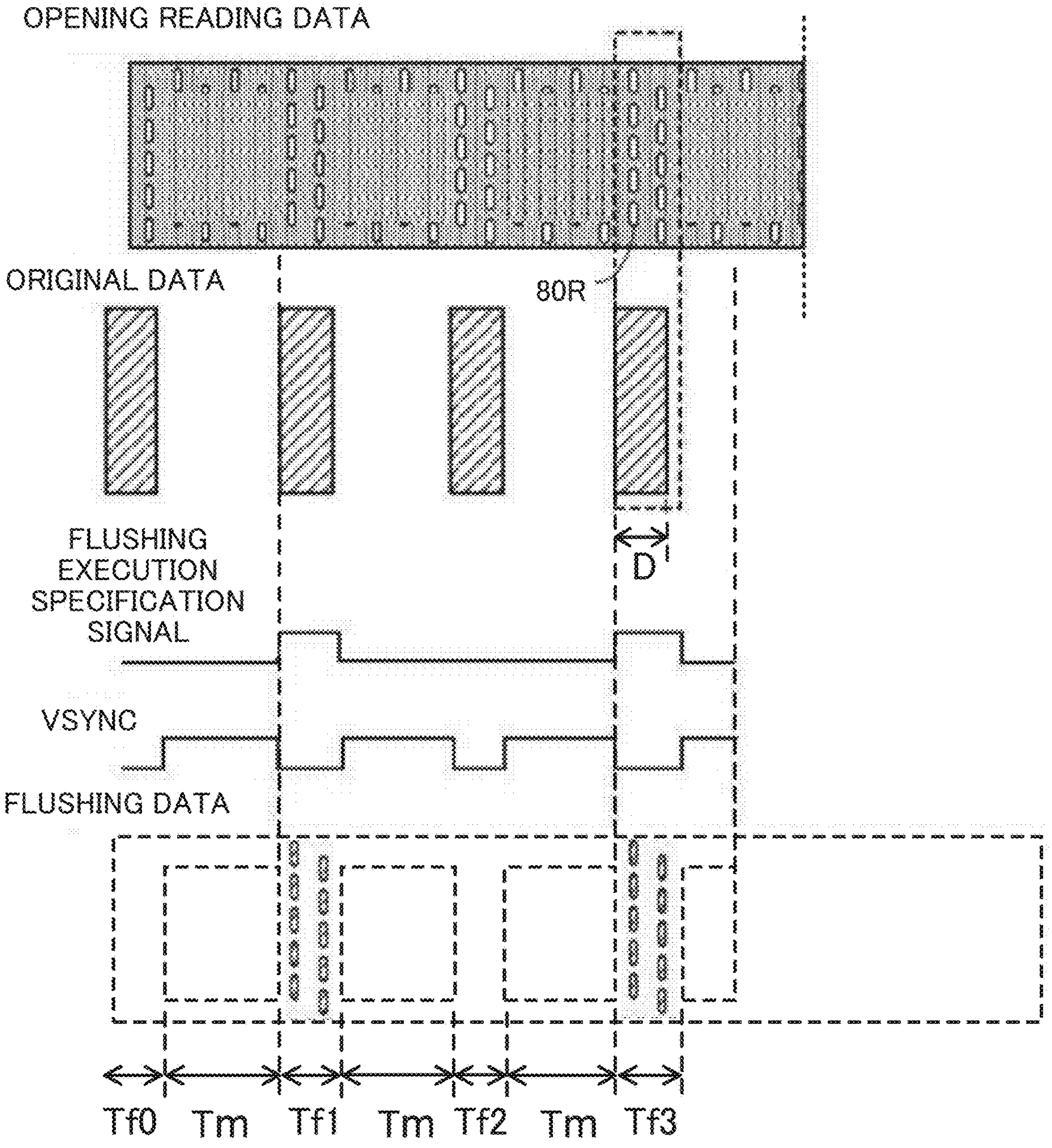
FIG. 14 is an illustration schematically showing still another method for generating flushing data.

FIG. 14 is an illustration schematically showing yet still another method for generating flushing data. The main controller 110D of the control device 110 may output a flushing execution specification signal. The flushing execution specification signal is a signal that specifies the execution and stopping of flushing according to the frequency of ink ejection in an image formation period Tm. In this case, the data generator 110A may generate flushing data based on the opening reading data, the original data, and the flushing execution specification signal.

For example, when a period just before the image formation period Tm for the first sheet P is set to an image non-formation period Tf0, the data generator 110A can generate flushing data by assigning the above original data to all the image non-formation periods Tf0 to Tf3 and extracting, from a piece of the original data left by masking the original data with the opening reading data, data in periods during which the flushing execution specification signal is enabled (at a high level). The main controller 110D can adjust, according to the frequency of ink ejection, the timing to enable the flushing execution specification signal and the length of the period during which the flushing execution specification signal is enabled. In this case, the data generator 110A can adjust, based on the flushing execution specification signal, the timing to generate flushing data (whether or not to execute flushing) and the length of the flushing data in the direction of conveyance.

When, as shown in the figure, the flushing execution specification signal is enabled in the image non-formation periods Tf1 and Tf3, the flushing controller 110B can obtain, as a result, the same flushing data as shown in FIG. 12 for doing flushing in the image non-formation periods Tf1 and Tf3, i.e., intermittent flushing. Therefore, also when flushing data is generated using a flushing execution specification signal, intermittent flushing, that is, flushing in the image non-formation periods Tf1 and Tf3, can be done and, thus, excessive flushing can be reduced. As a result, the increase in the amount of waste ink consumed due to excessive flushing can be reduced.

[8. Others]

The present invention is not limited to the above embodiment and various changes and modifications thereto are possible without departing from the spirit of the present invention. For example, also when flushing data is generated by the methods shown in FIGS. 5 to 7, the flushing controller 110B may control the number of flushings for each of all the ink ejection ports 18 inclusive of the ink ejection ports 18A to 18D facing the overlapped portions E of the openings 80, which enables necessary and sufficient flushing for each ink ejection port 18 and thus reduces failures in ink ejection and wasteful ink consumption.

Although in the above embodiment the data generator 110A generates flushing data by masking the original data for flushing read from the data storage 110C with the opening reading data, the flushing controller 110B may execute flushing by driving the recording heads 17A to 17C, without generation of flushing data by the data generator 110A, based on flushing data previously stored in the storage device 28. When the flushing counting device 30 counts the number of flushings, a necessary and sufficient number of flushings can be ensured even if flushing data uniform to every end portions of the openings 80 cannot be acquired. Therefore, the present invention in which the number of flushings is controlled is particularly effective for the case where flushing data is generated, followed by doing flushing based on the flushing data.

Although in the above embodiment the sheet P is conveyed in a system in which the sheet P is sucked against the first conveying belt 8 by negative-pressure suction, it is also possible to electrically charge the first conveying belt 8 and convey the sheet P via the first conveying belt 8 with the first conveying belt 8 electrostatically adsorbing the sheet P thereon (an electrostatic adsorption system).

Although in the above embodiment a color printer capable of recording a multi-color image using ink of four colors is used as an inkjet recording apparatus, it is also possible to apply the generation of flushing data and flushing control in the above embodiment to a black-and-white printer capable of recording a black-and-white image using black ink.

INDUSTRIAL APPLICABILITY

The present invention is applicable to inkjet recording apparatuses, such as an inkjet printer.

The invention claimed is:

1. An inkjet recording apparatus comprising:

a conveying belt including a plurality of openings and capable of sequentially conveying recording media;

a recording head including a plurality of nozzles that eject ink onto the recording medium being conveyed by the conveying belt to form an image on the recording medium; and a flushing controller that allows the recording head to do flushing by allowing each of the nozzles of the recording head to eject the ink with a different timing from a timing to form the image and allowing the ink ejected from the nozzle to pass through any one of the plurality of openings, wherein the conveying belt includes the openings formed as a plurality of rows of openings, each row composed of openings arranged at predetermined intervals in a widthwise direction of the conveying belt, the plurality of rows of openings are arranged at predetermined intervals in a direction of conveyance of the conveying belt so that the openings of each of the plurality of rows of openings include overlapped portions at which the openings are overlapped with the openings of any other of the plurality of rows of openings along the widthwise direction of the conveying belt, and the flushing controller allows the recording head to do the flushing by allowing each of all the nozzles inclusive of the nozzles facing the overlapped portions to eject the ink a predetermined number of times in an image non-formation period during which travel of the conveying belt causes the openings to pass through a location facing the recording head, the inkjet recording apparatus further comprising a display that displays a notification about execution of the flushing, wherein when the number of ejections of the ink from any of the nozzles in the image non-formation period has not reached the predetermined number, the flushing controller allows the display to display a notification that the flushing is insufficient, and wherein when the number of ejections of the ink from all the nozzles in the image non-formation period has reached the predetermined number, the flushing controller not allows the display to display the notification that the flushing is insufficient.

2. The inkjet recording apparatus according to claim 1, further comprising a flushing counting device that counts, during execution of the flushing, a number of ejections of the ink from each of all the nozzles individually, wherein the flushing controller allows the recording heads to prohibit ejection of the ink from the nozzle the number of ejections of the ink from which has reached the predetermined number of times.

3. The inkjet recording apparatus according to claim 1, wherein in allowing the recording head to eject the ink the predetermined number of times from each of the nozzles, the flushing controller allows the recording head to eject the ink within a predetermined range from a downstream end of each of the rows of openings in the direction of conveyance.

4. The inkjet recording apparatus according to claim 1, wherein in allowing the recording head to eject the ink the predetermined number of times from each of the nozzles, the flushing controller allows the recording head to eject the ink within a predetermined range from an upstream end of each of the rows of openings in the direction of conveyance.

5. The inkjet recording apparatus according to claim 1, wherein in allowing the recording head to eject the ink the predetermined number of times from each of the nozzles, the flushing controller allows the recording head to eject the ink in a manner separated into respective predetermined ranges from a downstream end and an upstream end of each of the rows of openings in the direction of conveyance.

6. The inkjet recording apparatus according to claim 1, further comprising:

a recording medium detection sensor that detects the recording medium and outputs a detection signal;

an opening detection sensor that reads the openings in the conveying belt to acquire opening reading data; and a data generator that recognizes, based on the detection signal, among regions for a plurality of the openings contained in the opening reading data, regions for the openings located off the recording medium detected by the recording medium detection sensor in the direction of conveyance and generates flushing data according to the recognized regions for the openings, wherein the flushing controller recognizes at least one of the image non-formation periods based on the detection signal and allows the recording head to do the flushing based on the flushing data in the at least one image non-formation period.

7. The inkjet recording apparatus according to claim 1, further comprising:

a first sheet output tray to which a recording medium being a normal product is to be discharged;

a second sheet output tray to which a recording medium being an abnormal product is to be discharged; and a conveyance mechanism that conveys the recording medium being the normal product toward the first sheet output tray and conveys the recording medium being the abnormal product toward the second sheet output tray, wherein when the number of ejections of the ink from any of the nozzles in the image non-formation period has not reached the predetermined number, the flushing controller allows the recording head to stop forming the image and allows the conveyance mechanism to convey as the abnormal product the recording medium fed to form an image thereon immediately after the image non-formation period and discharge the recording medium as the abnormal product to the second sheet output tray, and wherein when the number of ejections of the ink from all the nozzles in the image non-formation period has reached the predetermined number, the flushing controller allows the recording head to form the image and allows the conveyance mechanism to convey as the normal product the recording medium fed to form an image thereon immediately after the image non-formation period and discharge the recording medium as the normal product to the first sheet output tray.

8. An inkjet recording apparatus comprising:

a conveying belt including a plurality of openings and capable of sequentially conveying recording media;

a recording head including a plurality of nozzles that eject ink onto the recording medium being conveyed by the conveying belt to form an image on the recording medium; and a flushing controller that allows the recording head to do flushing by allowing each of the nozzles of the recording head to eject the ink with a different timing from a timing to form the image and allowing the ink ejected from the nozzle to pass through any one of the plurality of openings, wherein the conveying belt includes the openings formed as a plurality of rows of openings, each row composed of openings arranged at predetermined intervals in a widthwise direction of the conveying belt, the plurality of rows of openings are arranged at predetermined intervals in a direction of conveyance of the conveying belt so that the openings of each of the plurality of rows of openings include overlapped portions at which the openings are overlapped with the openings of any other of the plurality of rows of openings along the widthwise direction of the conveying belt, and the flushing controller allows the recording head to do the flushing by allowing each of all the nozzles inclusive of the nozzles facing the overlapped portions to eject the ink a predetermined number of times in an image non-formation period during which travel of the conveying belt causes the openings to pass through a location facing the recording head, the inkjet recording apparatus further comprising:

a recording medium detection sensor that detects the recording medium and outputs a detection signal;

an opening detection sensor that reads the openings in the conveying belt to acquire opening reading data; and a data generator that recognizes, based on the detection signal, among regions for a plurality of the openings contained in the opening reading data, regions for the openings located off the recording medium detected by the recording medium detection sensor in the direction of conveyance and generates flushing data according to the recognized regions for the openings, wherein the flushing controller recognizes at least one of the image non-formation periods based on the detection signal and allows the recording head to do the flushing based on the flushing data in the at least one image non-formation period, wherein the data generator masks predetermined original data for flushing with the opening reading data and generates as the flushing data a piece of the original data for flushing left in correspondence with the regions of the opening reading data for the openings by masking the original data with the opening reading data.

9. The inkjet recording apparatus according to claim 8, wherein the data generator scales down the regions of the opening reading data for the openings and generates the flushing data based on data on the scale-down regions and the original data.

10. The inkjet recording apparatus according to claim 8, wherein the original data has a data length corresponding to a lap of the conveying belt.

11. The inkjet recording apparatus according to claim 8, wherein when the number of ejections of the ink in an image formation period during which the recording medium detected by the recording medium detection sensor passes through a location facing the recording head is more than a predetermined number, the data generator generates the flushing data for allowing the recording head to do the flushing intermittently in a plurality of the image non-formation periods.

12. The inkjet recording apparatus according to claim 8, further comprising a controller that outputs a flushing execution specification signal that specifies execution and stopping of the flushing, wherein the data generator generates the flushing data by extracting, from the piece of the original data left by masking the original data with the opening reading data, data in a period during which the flushing execution specification signal is enabled.

* * * * *